(12) United States Patent
Tateishi

(10) Patent No.: US 11,386,904 B2
(45) Date of Patent: Jul. 12, 2022

(54) SIGNAL PROCESSING DEVICE, SIGNAL PROCESSING METHOD, AND PROGRAM

(71) Applicant: Sony Corporation, Tokyo (JP)

(72) Inventor: Kazuya Tateishi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/054,748

(22) PCT Filed: Mar. 19, 2019

(86) PCT No.: PCT/JP2019/011525
§ 371 (c)(1),
(2) Date: Nov. 11, 2020

(87) PCT Pub. No.: WO2019/220768
PCT Pub. Date: Nov. 21, 2019

(65) Prior Publication Data
US 2021/0225379 A1    Jul. 22, 2021

(30) Foreign Application Priority Data

May 18, 2018 (JP) .............................. JP2018-096136

(51) Int. Cl.
*G10L 15/28* (2013.01)
*G10L 25/51* (2013.01)
(Continued)

(52) U.S. Cl.
CPC .............. *G10L 15/28* (2013.01); *G10L 25/51* (2013.01); *H04R 1/406* (2013.01); *H04R 3/005* (2013.01)

(58) Field of Classification Search
CPC ......... G10L 15/28; G10L 25/51; G10L 15/20; G10L 21/0208; H04R 1/406; H04R 3/005;
(Continued)

(56) References Cited

U.S. PATENT DOCUMENTS

2003/0039353 A1   2/2003   Matsuo
2003/0177007 A1*  9/2003   Kanazawa .............. G10L 15/20
                                                          704/233
(Continued)

FOREIGN PATENT DOCUMENTS

CN        1655646 A        8/2005
CN        204750032 U      11/2015
(Continued)

OTHER PUBLICATIONS

International Search Report and English translation thereof dated Jun. 4, 2019 in connection with International Application No. PCT/JP2019/011525.

(Continued)

*Primary Examiner* — Yogeshkumar Patel
(74) *Attorney, Agent, or Firm* — Wolf, Greenfield & Sacks, P.C.

(57) ABSTRACT

Deterioration of voice extraction performance when positions of a plurality of microphones are changed is prevented.

A signal processing device according to an embodiment of the present technology includes a voice extraction unit that performs voice extraction from signals of a plurality of microphones, in which the voice extraction unit uses, when respective positions of the plurality of microphones are changed to positions where other microphones have been present, respective signals of the plurality of microphones as signals of the other microphones. Thus, it is possible to cancel the effect of changing the positions of respective microphones on the voice extraction.

11 Claims, 18 Drawing Sheets

(51) Int. Cl.
*H04R 1/40* (2006.01)
*H04R 3/00* (2006.01)

(58) Field of Classification Search
CPC ......... H04R 2201/401; H04R 2410/05; H04R 2430/20; G01S 3/8006
See application file for complete search history.

(56) References Cited

U.S. PATENT DOCUMENTS

| | | |
|---|---|---|
| 2005/0254640 A1 | 11/2005 | Ohki et al. |
| 2005/0259832 A1* | 11/2005 | Nakano ................. H04R 1/406 381/91 |
| 2007/0263889 A1 | 11/2007 | Melanson |
| 2009/0310811 A1 | 12/2009 | Inoda et al. |
| 2011/0013075 A1 | 1/2011 | Kim et al. |
| 2020/0329308 A1* | 10/2020 | Tateishi ................. H04R 1/028 |

FOREIGN PATENT DOCUMENTS

| | | | |
|---|---|---|---|
| CN | 105162950 A | | 12/2015 |
| JP | 2001-337694 A | | 12/2001 |
| JP | 2003-044092 A | | 2/2003 |
| JP | 2003044092 A | * | 2/2003 |
| JP | 2005-227511 A | | 8/2005 |
| JP | 2005-333211 A | | 12/2005 |
| JP | 2011-101407 A | | 5/2011 |
| JP | 2011101407 A | * | 5/2011 |
| JP | 2014-197771 A | | 10/2014 |
| JP | 2017-168903 A | | 9/2017 |
| JP | 2017168903 A | * | 9/2017 |
| JP | 2017-229002 A | | 12/2017 |
| JP | 2017229002 A | * | 12/2017 |

OTHER PUBLICATIONS

International Written Opinion and English translation thereof dated Jun. 4, 2019 in connection with International Application No. PCT/JP2019/011525.
International Preliminary Report on Patentability and English translation thereof dated Dec. 3, 2020 in connection with International Application No. PCT/JP2019/011525.
Chinese Office Action dated Oct. 28, 2021 in connection with Chinese Application No. 201980029602.0, and English translation thereof.
Lin, Research on implementation technology of speaker tracking and voice separation based on microphone array. Chinese Master's Theses Full-Text Database Information Technology Edition. Jul. 15, 2005. 65 pages.
Lu Zhenyu et al., Recognition optimization with multi-channel voice denoising. Computer Simulation; No. 06. Jun. 15, 2016. pp. 315-320.
Zhang et al., Method for optimizing layout of loudspeaker and microphone in automobile vehicle noise active control system. Journal of Vibration And Impact; v36(5). Mar. 15, 2017. pp. 169-175.

* cited by examiner

FIG. 11
A
SPATIAL SPECTRUM WHEN
NOISE LEARNING IS INSUFFICIENT
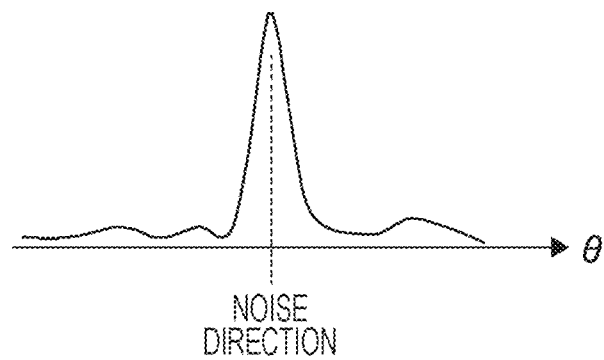
NOISE
DIRECTION
B
SPATIAL SPECTRUM WHEN
NOISE LEARNING PROGRESSES
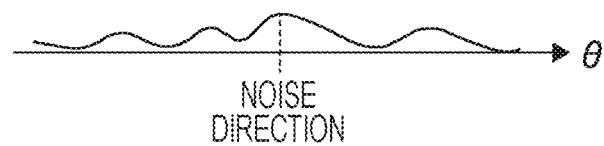
NOISE
DIRECTION
C
SPATIAL SPECTRUM AT TIME OF USER
SPEECH IMMEDIATELY AFTER ROTATING
TO SOUND SOURCE DIRECTION
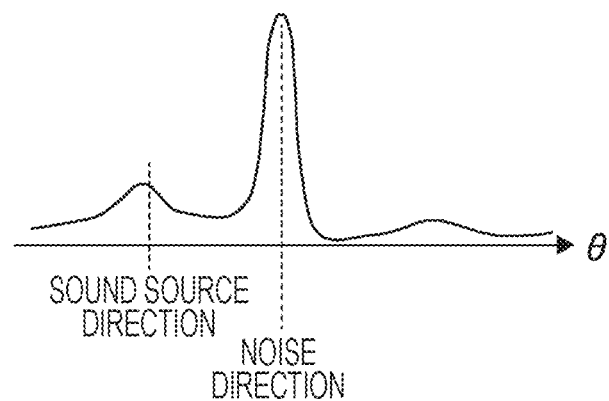
SOUND SOURCE
DIRECTION
NOISE
DIRECTION FIG. 13
A
SPATIAL SPECTRUM WHEN
NOISE LEARNING IS INSUFFICIENT
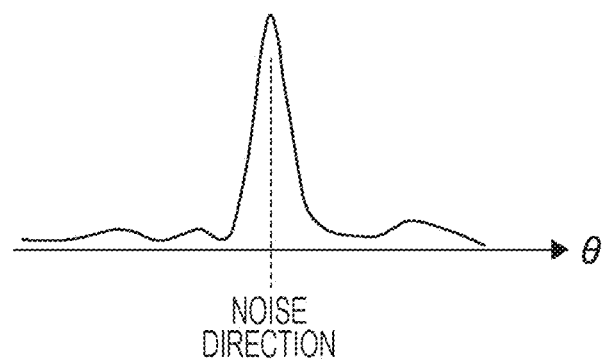
B
SPATIAL SPECTRUM WHEN
NOISE LEARNING PROGRESSES
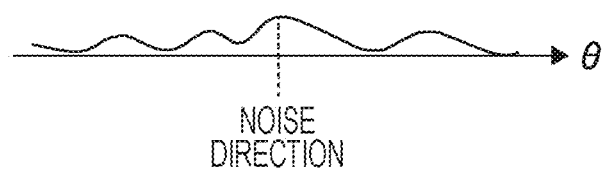
C
SPATIAL SPECTRUM AT TIME OF USER
SPEECH IMMEDIATELY AFTER ROTATING
TO SOUND SOURCE DIRECTION
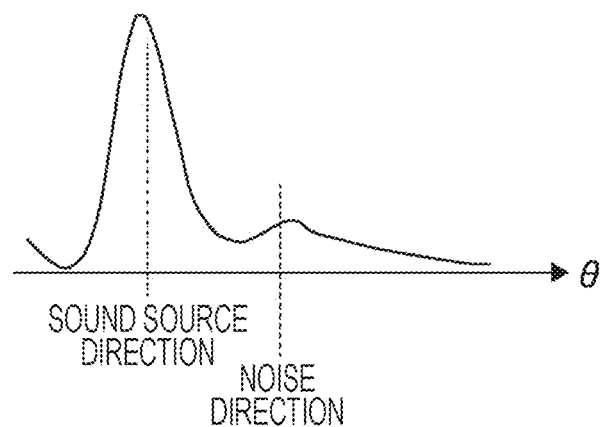

FIG. 15
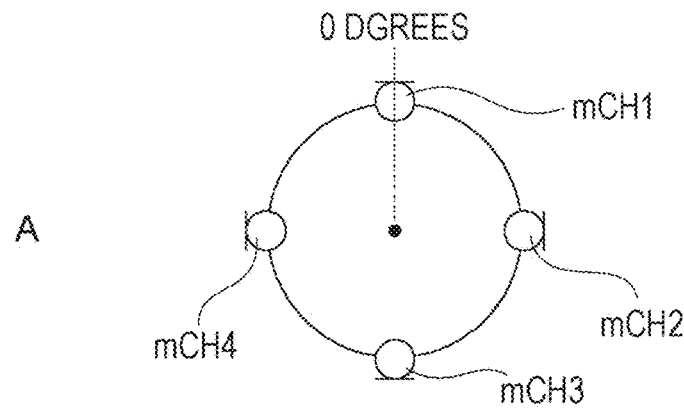
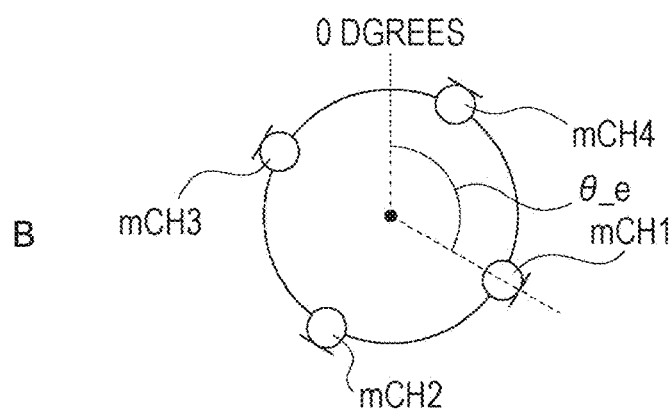
FIG. 16
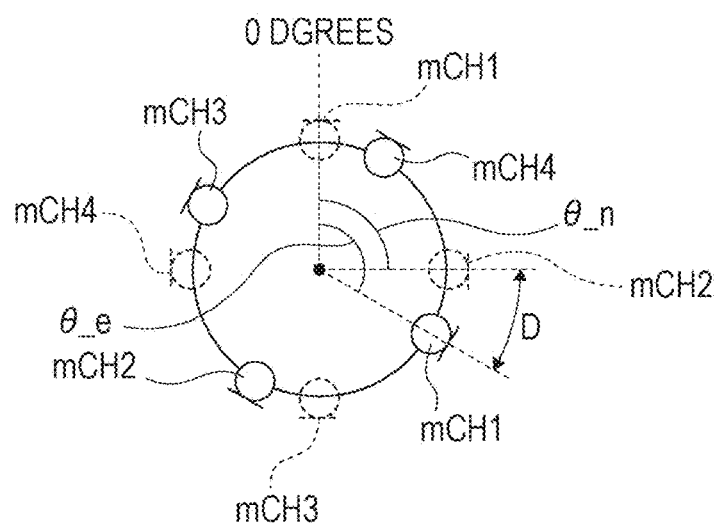

*FIG. 17*

| HORIZONTAL ANGLE($\theta$) | NOISE SPACE CORRELATION MATRIX |
|---|---|
| 0 | K_0 |
| 1 | K_1 |
| 2 | K_2 |
| ⋮ | ⋮ |
| 359 | K_359 |

SIGNAL PROCESSING DEVICE, SIGNAL PROCESSING METHOD, AND PROGRAM

CROSS REFERENCE TO RELATED APPLICATIONS

This is a U.S. National Stage Application under 35 U.S.C. § 371, based on International Application No. PCT/JP2019/011525, filed Mar. 19, 2019, which claims priority to Japanese Patent Application JP 2018-096136, filed May 18, 2018, each of which is hereby incorporated by reference in its entirety.

TECHNICAL FIELD

The present technology relates to a signal processing device, a method thereof, and a program for performing voice extraction of, for example, a speech sound or the like from signals of a plurality of microphones.

BACKGROUND ART

In recent years, by development of robot technology and artificial intelligence (AI), an increasing number of devices have become capable of talking with people or moving their bodies by themselves. In order to recognize human voice, it is necessary to assume various usage environments and suppress noise as much as possible. Accordingly, sounds are collected by a microphone array in which a plurality of microphones is arranged, and noise is suppressed by signal processing using spatial information.

For example, the following Patent Document 1 discloses a technique of estimating a direction of a speaking person by using a correlation matrix obtained by calculating signals collected by a microphone array, and emphasizing a voice in the estimated direction so as to achieve accurate voice extraction, thereby improving accuracy of voice recognition.

CITATION LIST

Patent Document

Patent Document 1: Japanese Patent Application Laid-Open No. 2001-337694

SUMMARY OF THE INVENTION

Problems to be Solved by the Invention

Here, among devices such as robots, some devices are made to face an estimated speech direction when a speech is detected. Then, as such a device, a device is also assumed in which the position of each microphone of the microphone array changes in facing the speech direction. In this device, in facing the speech direction, the positional relationship between information of a noise characteristic (particularly spatial noise direction information) that have been learned and the respective microphones collapses, and noise characteristic information that have been learned sequentially cannot be used any longer.

In this case, it is conceivable to learn the noise characteristic information again after the displacement of each microphone, but the next speech of the user may occur immediately after the device turns to the speech direction. In such a case, sufficient learning time cannot be secured, noise suppression performance deteriorates as a consequence, and there is a possibility that proper voice extraction cannot be performed.

The present technology has been made in view of the above problem, and an object thereof is to prevent deterioration in voice extraction performance when positions of a plurality of microphones are changed.

Solutions to Problems

A signal processing device according to the present technology includes a voice extraction unit that performs voice extraction from signals of a plurality of microphones, in which the voice extraction unit uses, when respective positions of the plurality of microphones are changed to positions where other microphones have been present, respective signals of the plurality of microphones as signals of the other microphones.

Thus, it is possible to cancel the effect of changing the positions of respective microphones on the voice extraction.

In the signal processing device according to the present technology described above, it is desirable that the voice extraction unit uses the respective signals of the plurality of microphones as signals of other microphones by a channel shift on the signals of the plurality of microphones.

The channel shift can be achieved by a simple method such as a method of giving, to the signal of each microphone, an identifier indicating with which processing channel the signal is to be processed, for example.

In the signal processing device according to the present technology described above, it is desirable that the voice extraction unit performs the voice extraction on the basis of the signals of the plurality of microphones arranged on a circumference.

Since the voice extraction is performed on the basis of the signals of the respective microphones arranged on the circumference, the voice extraction performance is improved in that the voice extraction is possible regardless of which direction the sound source direction is.

In the signal processing device according to the present technology described above, it is desirable that the voice extraction unit performs the voice extraction on the basis of noise characteristic learned on the basis of the signals of the plurality of microphones.

Thus, it becomes possible to perform the voice extraction on the basis of signals in which noise components are suppressed.

In the signal processing device according to the present technology described above, it is desirable that the voice extraction unit suspends the learning of the noise characteristic while the positions of the plurality of microphones are being changed.

Thus, it is possible to prevent the noise characteristic information, which had been learned before changing the position of the microphone, from changing due to learning during changing the position.

In the signal processing device according to the present technology described above, it is desirable that the voice extraction unit determines whether or not to perform the channel shift on the basis of a size of an error between the positions of the microphones after the positions are changed and positions where the other microphones have been present.

Thus, even if the positions of the microphone after the positions are changed and the positions where the other microphones have been present are not exactly the same positions, if the position error therebetween is small, it is possible to perform the voice extraction using the channel shift.

In the signal processing device according to the present technology described above, it is desirable that the voice extraction unit performs, in a case where the positions of the plurality of microphones are changed to positions different from the positions where the other microphones have been present, the voice extraction on the basis of the noise characteristic learned in a past.

Thus, even if the positions of the plurality of microphones are changed to positions different from the positions where the other microphones have been present, the voice extraction can be performed on the basis of the noise characteristic learned at the positions in the past.

In the signal processing device according to the present technology described above, it is desirable that the voice extraction unit decreases, in voice extraction based on the noise characteristic learned in the past, a degree of reflection of the noise characteristic learned in the past according to a passage of time, and increases a degree of reflection of the noise characteristic being learned according to the passage of time.

Thus, even if the noise characteristic has changed since the past learning, it is possible to perform appropriate voice extraction according to the current noise characteristic.

In the signal processing device according to the present technology described above, it is desirable that the voice extraction unit does not increase the degree of reflection of the noise characteristic during the learning when a current signal section of the signals of the microphones is regarded as a speech section.

If the noise characteristic is learned in the speech section, the accuracy of the noise characteristic deteriorates, and thus learning of the noise characteristic is not performed in the speech section. Thus, it is meaningless to increase the degree of reflection of the noise characteristic being learned in the speech section.

Further, a signal processing method according to the present technology includes a voice extraction step of performing voice extraction from signals of a plurality of microphones, in which in the voice extraction step, when respective positions of the plurality of microphones are changed to positions where other microphones have been present, respective signals of the plurality of microphones are used as signals of the other microphones.

Even with such a signal processing method, a similar operation and effect to those of the signal processing device according to the present technology described above can be obtained.

Moreover, a program according to the present technology is a program executed by an information processing device that performs voice extraction from signals of a plurality of microphones, the program causing the information processing device to implement a function of, in a case where respective positions of the plurality of microphones are changed to positions where other microphones have been present, using respective signals of the plurality of microphones as signals of the other microphones.

The signal processing device according to the present technology described above is achieved by such a program according to the present technology.

Effects of the Invention

According to the present technology, it is possible to prevent deterioration in voice extraction performance in a case where the positions of a plurality of microphones are changed.

Note that the effect described here is not necessarily limited, and may be any effect described in the present disclosure.

BRIEF DESCRIPTION OF DRAWINGS

FIG. 11 is a diagram expressing the problem illustrated in FIG. 10 by spatial spectra.

FIG. 13 is a diagram for explaining effects of the channel shifts.

FIG. 15 is a diagram illustrating an example of a rotation angle.

FIG. 16 is an explanatory diagram of a position error.

FIG. 17 is a diagram illustrating an example of a matrix table.

MODE FOR CARRYING OUT THE INVENTION

Hereinafter, embodiments according to the present technology will be described in the following order with reference to the accompanying drawings.

<1. First Embodiment>
 [1-1. External appearance configuration of signal processing device]
 [1-2. Electrical configuration of signal processing device]
 [1-3. Operation of signal processing device]
 [1-4. Signal processing method as embodiment]
 [1-5. Processing method]
<2. Second Embodiment>
 [2-1. Signal processing method as second embodiment]
 [2-2. Electrical configuration of signal processing device]
 [2-3. Processing procedure]
<3. Modification example>
<4. Summary of embodiment>
<5. Present technology>

1. First Embodiment

[1-1. External Appearance Configuration of Signal Processing Device]

Figure 1:
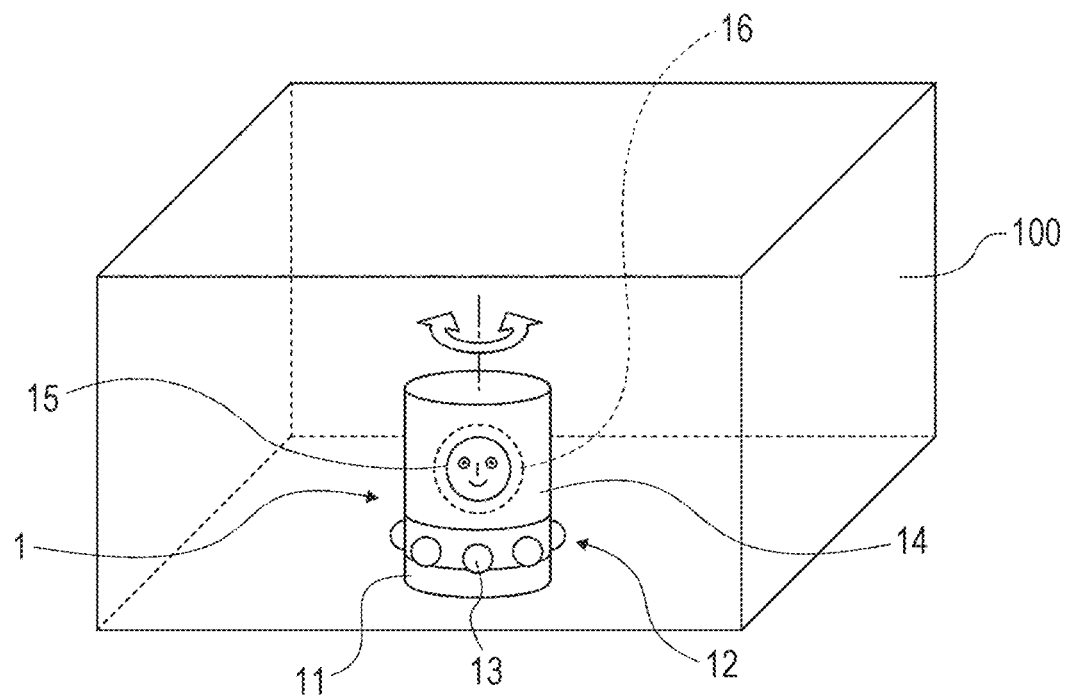
FIG. 1 is a perspective view illustrating an external appearance configuration example of a signal processing device as an embodiment according to the present technology.

FIG. 1 is a perspective view illustrating an external appearance configuration example of a signal processing device 1 as an embodiment according to the present technology.

As illustrated in the diagram, the signal processing device 1 includes a substantially columnar casing 11 and a substantially columnar movable unit 14 located above the casing 11.

The movable unit 14 is supported by the casing 11 so as to be rotatable in a direction indicated by an outline double-headed arrow in the diagram (rotation in a pan direction). The casing 11 does not rotate in conjunction with the movable unit 14, for example, in a state of being placed on a predetermined position such as a table or floor, and forms what is called a fixed portion.

The movable unit 14 is rotationally driven by a servo motor 21 (described later with reference to FIG. 3) incorporated in the signal processing device 1 as a drive unit.

A microphone array 12 is provided at a lower end of the movable unit 14.

Figure 2:
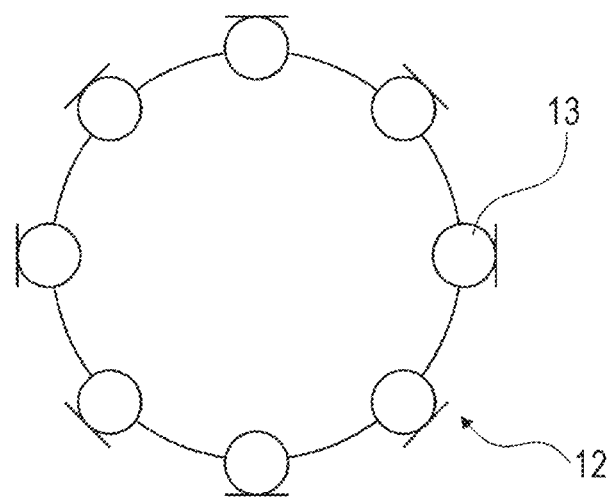
FIG. 2 is an explanatory diagram of a microphone array included in the signal processing device as the embodiment.

As illustrated in FIG. 2, the microphone array 12 is configured by arranging a plurality of (eight in the example of FIG. 2) microphones 13 on a circumference at substantially equal intervals.

Further, a display unit 15, for example, a liquid crystal display (LCD), an organic electro-luminescence (EL) display, or the like is provided above the microphone array 12 in the movable unit 14. In this example, a picture of a face is displayed on the display unit 15, and represents that the direction in which the face faces is a front direction of the signal processing device 1. As will be described later, the movable unit 14 is rotated so that the display unit 15 faces a speech direction, for example.

Further, in the movable unit 14, a speaker 16 is housed on a back side of the display unit 15. The speaker 16 outputs sounds such as a message to a user.

The signal processing device 1 as described above is disposed in, for example, a space 100 such as a room.

The signal processing device 1 is incorporated in, for example, a smart speaker, a voice agent, a robot, or the like, and has a function of estimating the speech direction of a voice when the voice is emitted from a surrounding sound source (for example, a person). The estimated direction is used to direct the front of the signal processing device 1 toward the speech direction.

[1-2. Electrical Configuration of Signal Processing Device]

Figure 3:
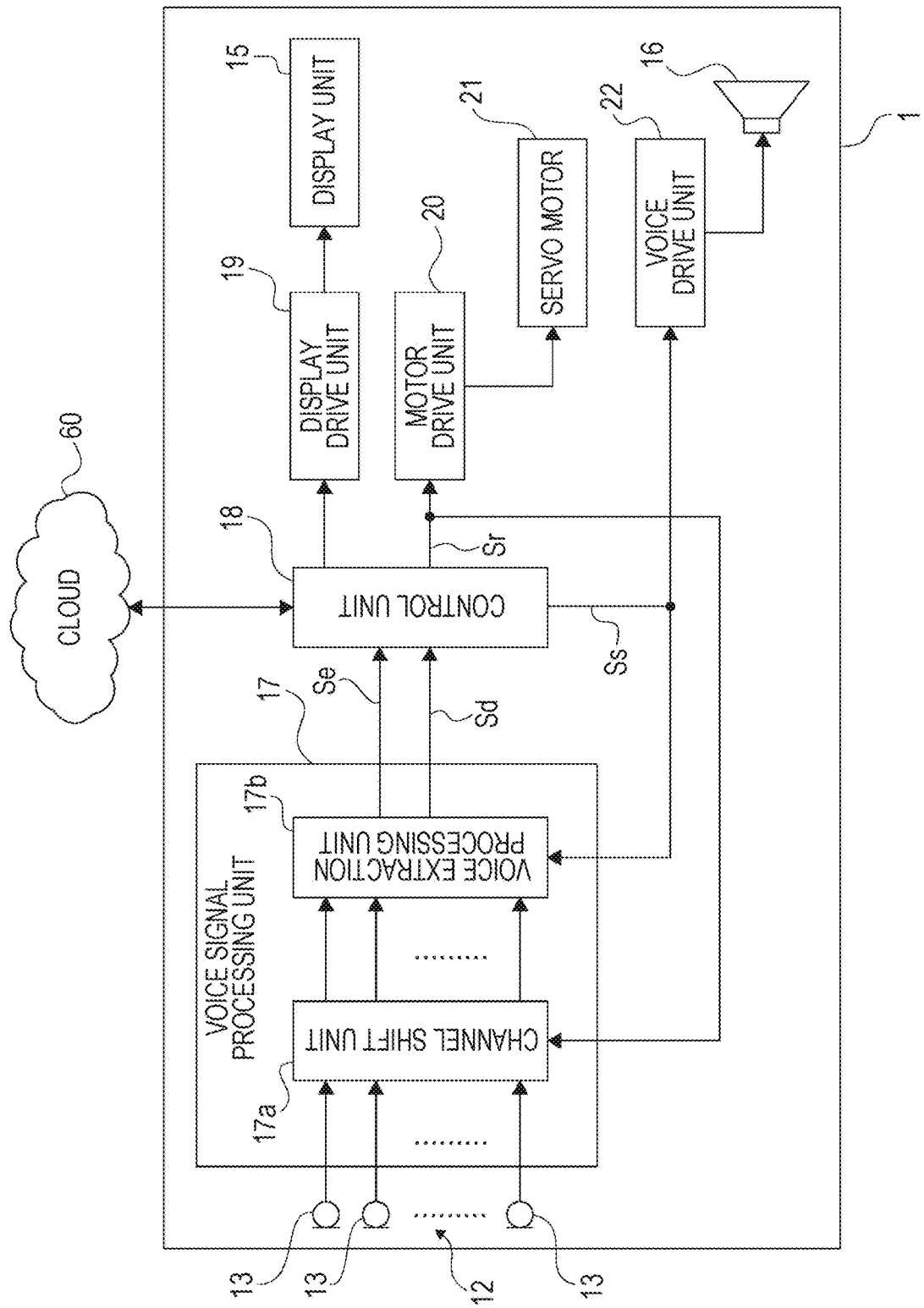
FIG. 3 is a block diagram for explaining an electrical configuration example of a signal processing device as a first embodiment.

FIG. 3 is a block diagram for explaining an electrical configuration example of the signal processing device 1.

As illustrated in the diagram, the signal processing device 1 includes, together with the microphone array 12, the display unit 15, and the speaker 16 described in FIG. 1, a voice signal processing unit 17, a control unit 18, a display drive unit 19, a motor drive unit 20, and a voice drive unit 22.

The voice signal processing unit 17 can include, for example, a digital signal processor (DSP), or a computer device having a central processing unit (CPU), or the like, and processes a signal from each microphone 13 in the microphone array 12.

The voice signal processing unit 17 includes a channel shift unit 17a and a voice extraction processing unit 17b, and signals from the respective microphones 13 are input to the voice extraction processing unit 17b via the channel shift unit 17a.

The voice extraction processing unit 17b performs extraction of a target sound (voice extraction) by estimating the speech direction, emphasizing the signal of the target sound, and suppressing noise on the basis of the signals of the respective microphones 13. The voice extraction processing unit 17b outputs an extracted voice signal Se to the control unit 18 as a signal obtained by extracting the target sound. Further, the voice extraction processing unit 17b outputs, to the control unit 18, information indicating the estimated speech direction as speech direction information Sd.

Note that details of the channel shift unit 17a and the voice extraction processing unit 17b will be described later again.

The control unit 18 includes a microcomputer having, for example, a CPU, a read only memory (ROM), a random access memory (RAM), and the like, and performs overall control of the signal processing device 1 by executing a process according to a program stored in the ROM.

For example, the control unit 18 performs control related to display of information by the display unit 15. Specifically, an instruction is given to the display drive unit 19 having a driver circuit for driving the display unit 15 to cause the display unit 15 to execute display of various types of information.

Further, the control unit 18 of this example includes a voice recognition engine that is not illustrated, and performs a voice recognition process on the basis of the extracted voice signal Se input from the voice signal processing unit 17 (voice extraction processing unit 17b) by the voice recognition engine, and also determines a process to be executed on the basis of the result of the voice recognition process.

Note that in a case where the control unit 18 is connected to a cloud 60 via the Internet or the like and a voice recognition engine exists in the cloud 60, the voice recognition engine can be used to perform the voice recognition process.

Further, when the control unit 18 receives input on the speech direction information Sd from the voice signal processing unit 17 accompanying detection of a speech, the control unit 18 calculates a rotation angle of the servo motor 21 necessary for directing the front of the signal processing device 1 in the speech direction, and outputs information indicating the rotation angle to the motor drive unit 20 as rotation angle information Sr.

The motor drive unit 20 includes a driver circuit or the like for driving the servo motor 21, and drives the servo motor 21 on the basis of the rotation angle information Sr input from the control unit 18.

Moreover, the control unit 18 controls sound output by the speaker 16. Specifically, the control unit 18 outputs a voice signal to the voice drive unit 22 including a driver circuit (amplifier or the like) for driving the speaker 16, and causes the speaker 16 to execute voice output according to the voice signal.

Note that hereinafter, the voice signal output by the control unit 18 to the voice drive unit 22 in this manner will be referred to as an "output voice signal Ss".

Here, the output voice signal Ss is also output to the voice extraction processing unit 17b in the voice signal processing unit 17 for echo cancellation described later.

Figure 4:
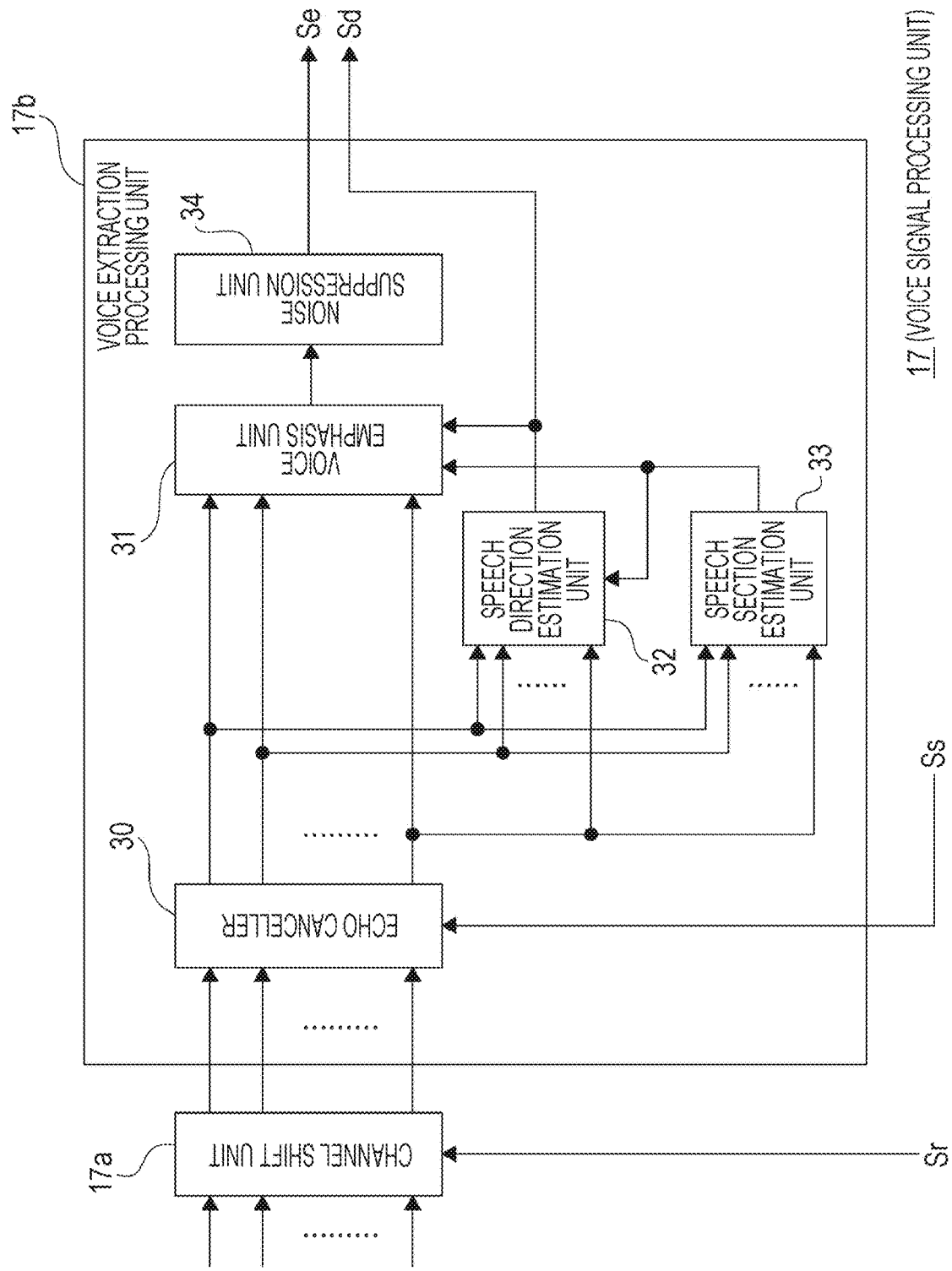
FIG. 4 is a block diagram illustrating an internal configuration example of a voice signal processing unit included in the signal processing device as the first embodiment.

FIG. 4 is a block diagram illustrating an internal configuration example of the voice signal processing unit 17.

As illustrated in the diagram, the voice signal processing unit 17 includes the channel shift unit 17a and the voice extraction processing unit 17b illustrated in FIG. 3, and the voice extraction processing unit 17b includes an echo canceller 30, a voice emphasis unit 31, a speech direction estimation unit 32, a speech section estimation unit 33, and a noise removal unit 34.

The echo canceller 30 performs processing for canceling an echo component included in the signal from each microphone 13 on the basis of the output voice signal Ss. That is, the voice output from the speaker 16 may be delayed by a predetermined time and then picked in a state of being mixed with other sounds by the microphone array 12 as an echo. The echo canceller 30 uses the output voice signal Ss as a reference signal and performs a process so as to cancel an echo component from the signal of each microphone 13.

The speech section estimation unit 33 performs a process of estimating a speech section (a section of a speech in the time direction) on the basis of the signal of each microphone 13 via the echo canceller 30, and outputs speech section information Sp that is information indicating the speech section to the speech direction estimation unit 32 and the voice emphasis unit 31.

Note that various methods, for example, methods using artificial intelligence (AI) technology (such as deep learning) and the like can be considered as a specific method for estimating the speech section, and the method is not limited to a specific method.

The speech direction estimation unit 32 estimates the speech direction on the basis of the signal of each microphone 13 input from the echo canceller 30 and the speech section information Sp. The speech direction estimation unit 32 outputs information indicating the estimated speech direction as the speech direction information Sd.

Note that the internal configuration example of the speech direction estimation unit 32 and the speech direction estimation process will be described later again.

The voice emphasis unit 31 emphasizes a signal component corresponding to a target sound (speech sound here) among signal components included in the signal of each microphone 13 via the echo canceller 30 on the basis of the speech direction information Sd output by the speech direction estimation unit 32 and the speech section information Sp output by the speech section estimation unit 33. Specifically, a process of emphasizing the component of a sound source existing in the speech direction is performed by beam forming.

The noise suppression unit 34 suppresses a noise component (mainly a stationary noise component) included in the output signal by the voice emphasis unit 31.

The output signal from the noise suppression unit 34 is output from the voice extraction processing unit 17b as the extracted voice signal Se described above.

Figure 5:
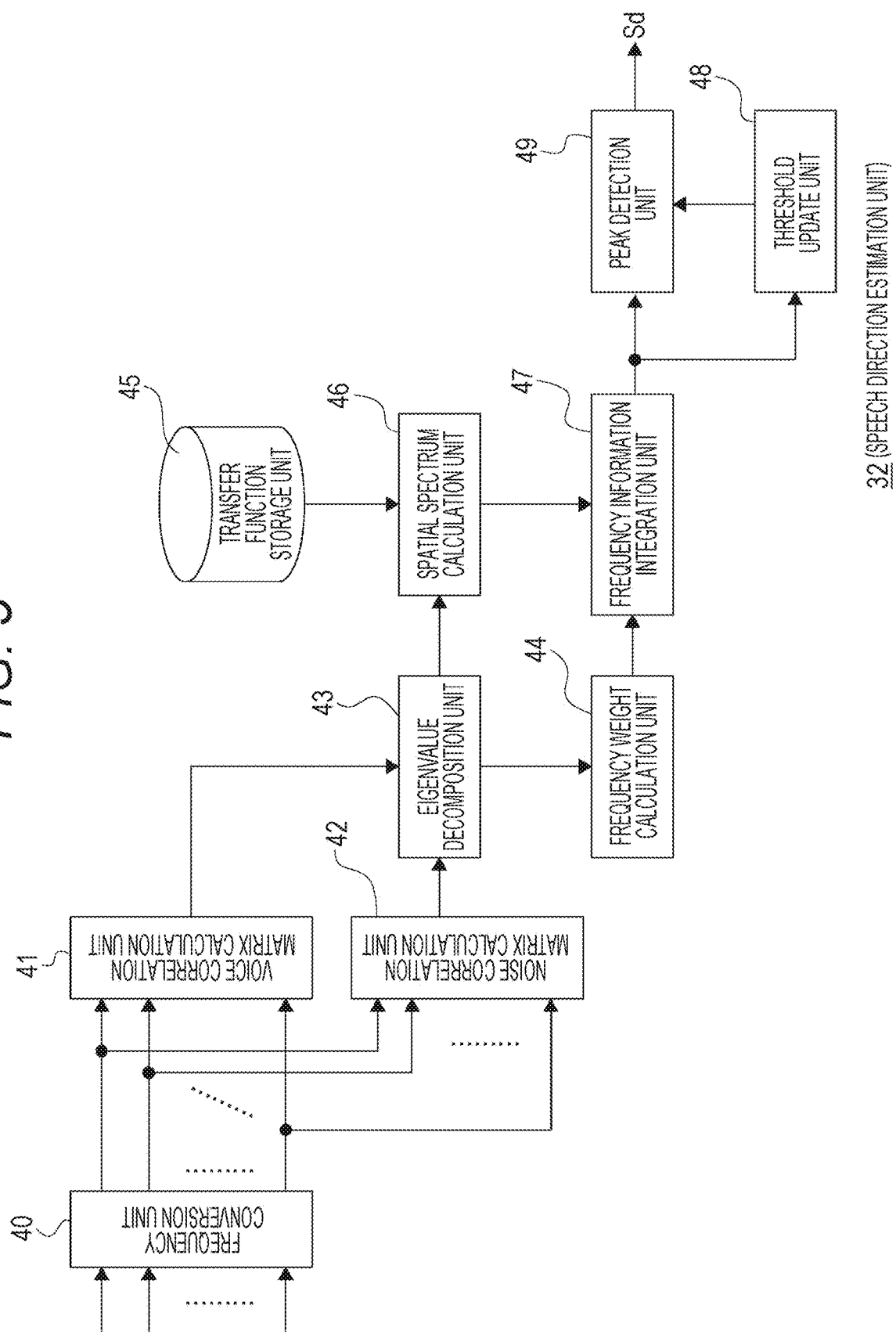
FIG. 5 is a block diagram illustrating an internal configuration example of a speech direction estimation unit included in the signal processing device as the first embodiment.

FIG. 5 is a block diagram illustrating an internal configuration example of the speech direction estimation unit 32.

The speech direction estimation unit 32 includes a frequency conversion unit 40, a voice correlation matrix calculation unit 41, a noise correlation matrix calculation unit 42, an eigenvalue decomposition unit 43, a frequency weight calculation unit 44, a transfer function storage unit 45, a spatial spectrum calculation unit 46, a frequency information integration unit 47, a threshold update unit 48, and a peak detection unit 49.

This configuration corresponds to a sound source direction estimation method based on what is called Multiple Signal Classification (MUSIC) method, and is specifically configured to perform speech direction estimation by the GEVD-MUSIC method. Here, the generalized eigenvalue decomposition (GEVD) means generalized eigenvalue decomposition, and the GEVD-MUSIC method is also called MUSIC method using generalized eigenvalue decomposition.

The frequency conversion unit 40 converts the signal (time signal) from each microphone 13 input via the echo canceller 30 into a frequency signal by orthogonal conversion such as fast Fourier transformation (FFT) or discrete cosine transformation (DCT), for example.

In the following configuration, an eigenvalue and an eigenvector are obtained for a correlation matrix of the signal of each frequency in a frequency domain.

The voice correlation matrix calculation unit 41 calculates the correlation matrix of the target signal of each frequency for every processing unit (frame) in the time direction. The noise correlation matrix calculation unit 42 calculates the correlation matrix of a noise signal of each frequency for every frame.

Here, the length of the frame may be, for example, about 32 ms, and a frame shift may be, for example, 10 ms.

The eigenvalue decomposition unit 43 calculates an eigenvalue and an eigenvector of the correlation matrix. The frequency weight calculation unit 44 calculates a frequency weight representing the degree of contribution of a spatial spectrum for every frequency. Here, when sound comes from a certain direction, the distribution of eigenvalues is biased, and only the eigenvalues corresponding to the number of sound sources increase.

The transfer function storage unit 45 stores a predetermined transfer function vector. The spatial spectrum calculation unit 46 uses the eigenvector and the transfer function vector related to a rotation angle of the signal processing device 1 in the pan direction (hereinafter referred to as "horizontal angle θ") to calculate a spatial spectrum representing the degree of incoming sound from the direction of the horizontal angle G. The frequency information integration unit 47 integrates the spatial spectrum on the basis of the frequency weights.

The threshold update unit 48 calculates a threshold for determining whether or not to employ the peak of the spatial spectrum as a detection result. The peak detection unit 49 detects the direction (horizontal angle θ) of the spatial spectrum having a peak exceeding the threshold. Thus, the direction in which the speech sound arrives, that is, the speech direction is detected. Information indicating this speech direction is output from the speech direction estimation unit 32 as the speech direction information Sd.

[1-3. Operation of Signal Processing Device]

Figure 6:
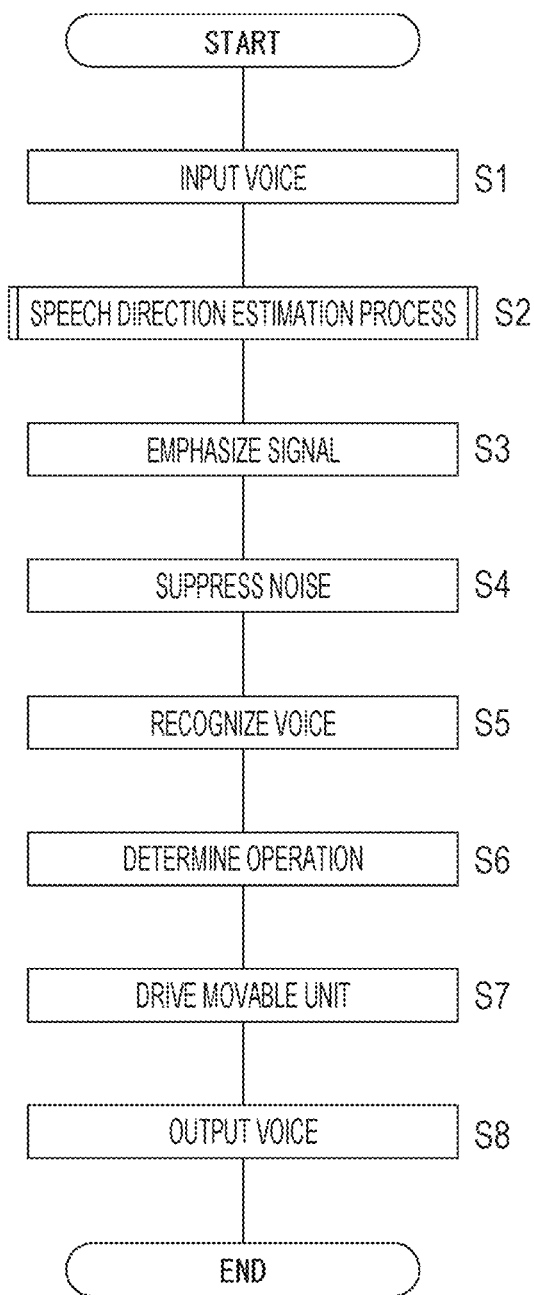
FIG. 6 is a flowchart for explaining an operation of the signal processing device as the embodiment.

Next, operation of the signal processing device 1 will be described with reference to the flowchart in FIG. 6. In FIG. 6, first, in step S1, the microphone array 12 inputs a voice. That is, the voice generated by a speaking person is input.

In step S2, the speech direction estimation unit 32 executes the speech direction estimation process. Note that details of the speech direction estimation process will be described later with reference to FIG. 7.

In step S3, the voice emphasis unit 31 emphasizes a signal. That is, a voice component in the direction estimated as the speech direction is emphasized.

In the following step S4, the noise suppression unit 73 suppresses a noise component to improve the signal-to-noise ratio (SNR).

In step S5, the control unit 18 (or an external voice recognition engine existing in the cloud 60) performs a process of recognizing a voice. That is, the process of recognizing a voice is performed on the basis of the extracted voice signal Se input from the voice signal processing unit 17. Note that the recognition result is converted into a text as necessary.

In step S6, the control unit 18 determines an operation. That is, an action corresponding to content of the recognized voice is determined. Then, in step S7, the control unit 18 controls the motor drive unit 20 to drive the movable unit 14 by the servo motor 21.

Moreover, in step S8, the control unit 18 causes the voice drive unit 22 to output the voice from the speaker 16.

Thus, for example, when a greeting such as "hi" is recognized from the speaking person, the movable unit 14 is rotated in the direction of the speaking person, and a greeting such as "Hi. How are you?" is sent to the speaking person from the speaker 16.

Figure 7:
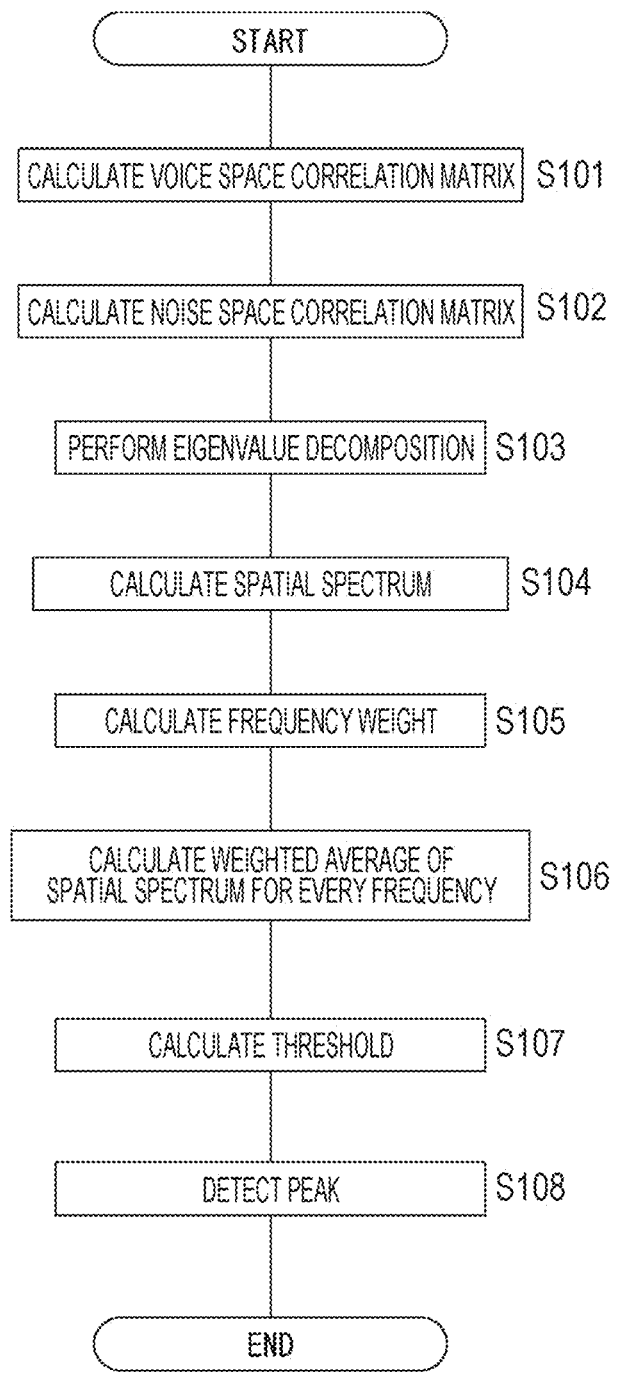
FIG. 7 is a flowchart of a speech direction estimation process in the embodiment.

FIG. 7 is a flowchart of the speech direction estimation process.

Note that in this diagram, it is assumed that the frequency conversion unit 40 has already performed frequency conversion.

In FIG. 7, first, in step S101, the voice correlation matrix calculation unit 41 calculates a voice space correlation matrix. The voice space correlation matrix is a correlation matrix that represents a spatial bias of the signal of the target sound of each frequency for every frame, and each element thereof represents the correlation of the signal of each microphone 13.

Here, the voice space correlation matrix is calculated on the basis of the following [Formula 1]. Note that in [Formula 1], $T_R$ represents a frame length for calculating a correlation matrix, and a vector $z_{\omega,\tau}$ represents a signal with a frequency $\omega$ in a frame $\tau$. H represents a Hermitian transposition.

[MathematicalFormula 1]

$$R_{\omega,t} = \frac{1}{T_R} \sum_{\tau=t-T_R}^{t} Z_{\omega,\tau} Z_{\omega,\tau}^H \qquad \text{[Formula 1]}$$

In the next step S102, the noise correlation matrix calculation unit 42 calculates a noise space correlation matrix. The noise space correlation matrix is a correlation matrix that represents a spatial bias of the noise signal of each frequency for every frame, and is calculated on the basis of the following [Formula 2].

[MathematicalFormula 2]

$$K_{\omega,t} = \frac{1}{T_K} \sum_{\tau=t-\Delta t-T_K}^{t-\Delta t} \alpha_{\omega,\tau} Z_{\omega,\tau} Z_{\omega,\tau}^H \qquad \text{[Formula 2]}$$

In [Formula 2], $T_K$ represents a frame length for calculating the correlation matrix, and $\Delta t$ is for preventing a signal of a common frame from being used in $R_{\omega,t}$ in [Formula 1] and $K_{\omega,t}$ in [Formula 2]. $\alpha_{\omega,\tau}$ is a weight and may generally be "1", but if it is desired to change the weights according to the type of sound source, it is possible to prevent all weights from becoming "0" as in [Formula 3].

[Mathematical Formula 3]

$$L_{\omega,t} = (1-\alpha_{\omega,t})K_{\omega,w,t-1} + \alpha_{\omega,t}z_{\omega,t-\Delta t}z_{\omega,t-\Delta t}^H \qquad \text{[Formula 3]}$$

According to [Formula 3], the noise correlation matrix calculation unit 42 sequentially updates the noise space correlation matrix to which a weight is applied and which is the target of the generalized eigenvalue decomposition by the eigenvalue decomposition unit 43 in a subsequent stage, on the basis of the noise space correlation matrix to which a past weight is applied. With such an updating formula, it is possible to use the stationary noise component for a long time. Moreover, if the weight is a continuous value of 0 to 1, the weight integration count becomes larger and the weight becomes smaller on the noise space correlation matrix toward the past, and thus the weight placed on the stationary noise component is larger toward the latest time. Therefore, it becomes possible to calculate the noise space correlation matrix with a large weight being placed on the stationary noise component at the latest time, which is considered to be close to the stationary noise component in the background of the target sound.

In step S103, the eigenvalue decomposition unit 43 performs eigenvalue decomposition. That is, the generalized eigenvalue decomposition based on the weighted noise space correlation matrix supplied from the noise correlation matrix calculation unit 42 and the voice space correlation matrix supplied from the voice correlation matrix calculation unit 41 is performed.

For example, an eigenvalue and an eigenvector are calculated from the following [Formula 4]. [Mathematical Formula 4]

$$R_{\omega,t}e_{\omega,t,i} = \lambda_{\omega,t,i} K_{\omega,t} e_{\omega,t,i} \qquad \text{[Formula 4]}$$

In [Formula 4], $\lambda_i$ is the i-th largest eigenvalue vector obtained by the generalized eigenvalue decomposition, $e_i$ is the eigenvector corresponding to $\lambda_i$, and M is the number of microphones 13.

In a case of the generalized eigenvalue decomposition, [Formula 4] is transformed into [Formula 6] and [Formula 7] using a matrix $\phi_{\omega,t}$ that satisfies the following [Formula 5]. Thus, the eigenvalue and the eigenvector are obtained from [Formula 6] and [Formula 7].

[Mathematical Formula 5]

$$\phi_{\omega,t}^H \phi_{\omega,t} = K_{\omega,t} \qquad \text{[Formula 5]}$$

$$(\phi_{\omega,t}^{-H} R_{\omega,t} \phi_{\omega,t}^{-1}) f_{\omega,t,i} = \lambda_{\omega,t,i} f_{\omega,t,i} \qquad \text{[Formula 6]}$$

$$f_{\omega,w,i} = \phi_{\omega,t} e_{\omega,t,i} \qquad \text{[Formula 7]}$$

$\Phi-H_{\omega,t}$ in [Formula 6] is a whitening matrix, and in the parenthesis on the left side of [Formula 6], $R_{\omega,t}$ is whitened with a stationary noise component, that is, the stationary noise component is removed therefrom.

In step S104, the spatial spectrum calculation unit 46 calculates a spatial spectrum $P^{nis\ \omega,\theta,t}$ on the basis of the following [Formula 8] and [Formula 9]. That is, the spatial spectrum calculation unit 46 uses the eigenvectors $e_i$ and the steering vector ae corresponding to M−N eigenvalues from a smaller one to calculate the spatial spectrum $P^{nsi\ \omega,\theta,t}$ representing the degree of arrival of sound from the direction θ (horizontal angle θ).

The eigenvector ei is supplied from the eigenvalue decomposition unit 43.

The steering vector ae, which is a transfer function with respect to the direction θ, is a transfer function obtained in advance assuming that a sound source exists in the direction θ, and is stored in the transfer function storage unit 45 in advance.

[MathematicalFormula 6]

$$P^n_{\omega,\theta,t} = \frac{a^H_{\omega,\theta}\phi^{-1}_{\omega,t}\phi^{-H}_{\omega,t}a_{\omega,\theta}}{a^H_{\omega,\theta}\phi^{-1}_{\omega,t}F^n_{\omega,t}F^{nH}_{\omega,t}\phi^{-H}_{\omega,t}a_{\omega,\theta}}$$ [Formula 8]

$$F^n_{\omega,t} = [f_{\omega,t,N+1}, \ldots, f_{\omega,t,M}]$$ [Formula 9]

Note that in [Formula 9], N represents the number of sound sources.

In step S105, the frequency weight calculation unit 44 calculates a frequency weight representing a contribution degree of the spatial spectrum for every frequency. As described above, in a case where sound comes from a certain direction, the distribution of eigenvalues is biased, and only the eigenvalues corresponding to the number of sound sources increase. For example, a frequency weight $w_{\omega,t}$ is calculated according to the following [Formula 10]. $\lambda_i$ is the i-th largest eigenvalue obtained by the generalized eigenvalue decomposition, and the eigenvalue of the numerator in [Formula 10] means the largest eigenvalue.

[MathematicalFormula 7]

$$W_{\omega,t} = \frac{\lambda_{\omega,t,1}}{\sum_{m=1}^{M} \lambda_{\omega,t,m}} \quad (i = 1, \ldots, M)$$ [Formula 10]

In step S106, the frequency information integration unit 47 calculates a weighted average $P^{\sim nis\ \theta,t}$ of the spatial spectrum for every frequency according to the following [Formula 11] and [Formula 12].

The spatial spectrum $P^{nis\ \omega,\theta,t}$ is supplied from the spatial spectrum calculation unit 46, and the frequency weight $w_{\omega,t}$ is supplied from the frequency weight calculation unit 44.

[MathematicalFormula 8]

$$\overline{P}^n_{\theta,t} = \frac{\sum_\omega w_{\omega,t}}{\sum_\omega \frac{w_{\omega,t}}{P^n_{\omega,\theta,t}}}$$ [Formula 11]

$$\hat{P}^n_{\theta,t} = \log \overline{P}^n_{\theta,t} - \min_{\theta'} \log \overline{P}^n_{\theta',t}$$ [Formula 12]

Note that the second term of [Formula 12] is to minimize log $P^{-n\theta'}$,t of [Formula 12] when θ' is changed in a predetermined horizontal angle range with reference to the direction θ for calculating the spatial spectrum.

Although a harmonic mean is obtained in the calculation of [Formula 11], an arithmetic mean or a geometric mean may also be obtained. The minimum value is normalized to "0" by the calculation of [Formula 12] and the base of log in this calculation is arbitrary, but the Napier's constant can be used, for example. The calculation of [Formula 12] has an effect of suppressing peaks unrelated to the sound source in the peak detection unit 49 in the subsequent stage to be equal to or less than a threshold.

Next, in a step S107, the threshold update unit 48 calculates the threshold. That is, in the weighted average $P^{\sim n\theta,t}$ of the spatial spectrum output from the frequency information integration unit 47, a threshold $P^{th\theta,t}$ for determining whether or not to perform peak detection is calculated, for example, according to the following [Formula 13] and [Formula 14]. Each of $\alpha^{th}$, $\beta^{th}$, and $\gamma^{th}$ is a constant, and Θ represents the number of scanning directions.

[MathematicalFormula 9]

$$P^{th}_{\theta,t} = \beta^{th} D^{th}_{\theta,t} + \max\left[\gamma^{th}, \frac{1}{\Theta}\sum_{\theta'=1}^{\theta}\hat{P}^n_{\theta,t}\right]$$ [Formula 13]

$$D^{th}_{\theta,t} = (1 - \alpha^{th})D^{th}_{\theta,t-1} + \alpha^{th}\hat{P}^n_{\theta,t}$$ [Formula 14]

This threshold $P^{th\theta,t}$ has an effect of removing a sound whose sound source is not in the direction thereof but which has a peak with a small value or removing a sound that continues to be emitted from a certain direction. The target sound is often a short command or a speech for operating the device, and is assumed not to last for a long time.

Next, in step S108, the peak detection unit 49 detects a peak. That is, out of the weighted averages $P^{\sim n\theta,t}$ of the spatial spectrum output from the frequency information integration unit 47, one having a peak exceeding the threshold $P^{th\theta,t}$ output from the threshold update unit 48 is detected. Then, the horizontal angle θ corresponding to the weighted average $P^{\sim n\theta,t}$ of the spatial spectrum having the detected peak is identified as the speech direction.

Here, characteristics of the spatial spectrum will be described with reference to FIGS. 8 and 9.

Figure 8:
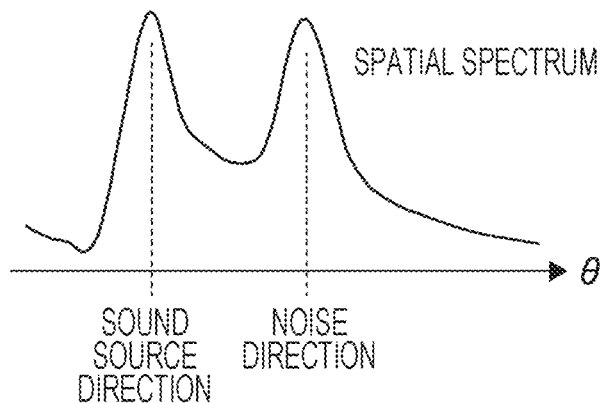
FIG. 8 is a diagram exemplifying characteristics of a spatial spectrum by a standard MUSIC method.
Figure 9:
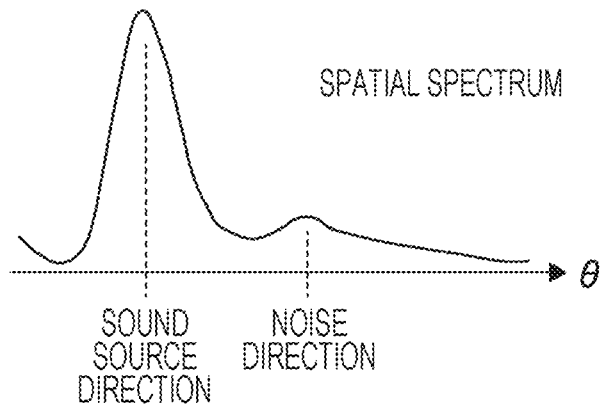
FIG. 9 is a diagram exemplifying characteristics of a spatial spectrum by the MUSIC method using generalized eigenvalue decomposition.

FIG. 8 illustrates the characteristics of the spatial spectrum by the standard MUSIC method.

In the standard MUSIC method, in an environment with one sound source, the spatial spectrum has a sharp peak at the position of the horizontal angle θ in the sound source direction (speech direction). However, in an environment in which noise is constantly generated, for example, as illustrated in FIG. 8, peaks may appear not only in the speech direction but also in a noise direction. Further, the spectrum may be distorted and the peak may not be obtained clearly.

Therefore, in the present embodiment, the sound source direction estimation is performed by the MUSIC method using the generalized eigenvalue decomposition instead of the standard MUSIC method. As described with reference to the above [Formula 6], the noise is whitened by the generalized eigenvalue decomposition. Thus, spatially colored noise can be whitened, and thus when the MUSIC method is performed using the new eigenvector obtained, as illustrated in FIG. 9, in comparison to the speech direction, the peak in the noise direction can be suppressed from the spatial spectrum.

In the MUSIC method using the generalized eigenvalue decomposition, $K_{\omega,t}$, which means the noise space correlation matrix, is sequentially learned and updated by the above [Formula 2]. Note that, hereinafter, the symbol of the noise space correlation matrix is simply expressed as "K".

The learning of the noise space correlation matrix K estimates characteristics of noise in the usage environment, and for example, when sound such as television broadcasting or radio broadcasting is constantly being emitted, noise information in that direction is stored in the noise space correlation matrix K. Consequently, the direction of a television or radio is unlikely to be detected erroneously in detecting a speech of a person. A certain amount of time is needed to store sufficient information in the noise space correlation matrix K.

Here, the speech direction estimation unit 32 does not learn the noise space correlation matrix K in the speech section estimated by the speech section estimation unit 33. In other words, the noise space correlation matrix K is learned for a non-speech section.

[1-4. Signal Processing Method as Embodiment]

Here, in the above-described signal processing device 1, when the user speaks, the movable unit 14 is rotated so as to face the speech direction, but at this time, the microphone array 12 also rotates in conjunction. Thus, the position of each microphone 13 in the space 100 changes, and the noise space correlation matrix K learned up to that point cannot be used as it is.

Figure 10:
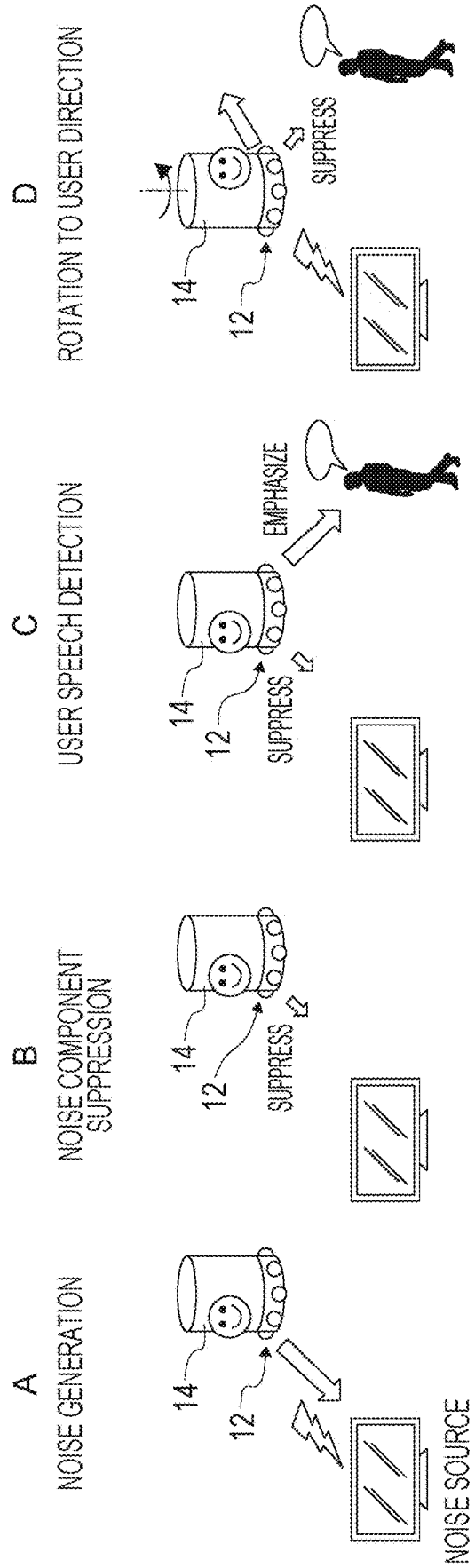
FIG. 10 is an explanatory diagram of a problem associated with changes in positions of respective microphones.

This point will be described with reference to FIG. 10.

As illustrated in FIG. 10A, for example, in a situation where noise is generated from a stationary noise source such as a television, in the MUSIC method using the generalized eigenvalue decomposition, by learning the noise space correlation matrix K, as illustrated in FIG. 10B, a component (noise component) from a direction in which the noise source exists can be suppressed. Then, as illustrated in FIG. 10C, when a speech of the user occurs, a speech sound component of the user can be appropriately extracted without being disturbed by the component in the noise direction.

However, when the movable unit 14 rotates so as to face the speech direction, the direction to be suppressed also changes. FIG. 10D illustrates an example in which the direction to be suppressed is directed toward the speaking user due to rotation of the movable unit 14. In this case, the speech sound component to be originally emphasized is taken as the suppression target, and the noise component from the noise source is not suppressed. Thus, the speech sound component cannot be properly detected, and the voice recognition performance is deteriorated.

FIG. 11 is a diagram expressing transitions of FIGS. 10A to 10D by spatial spectra.

FIG. 11A exemplifies a spatial spectrum when noise learning is insufficient, and in this state, a peak occurs in the noise direction. As the noise learning progresses, the peak in the noise direction is suppressed as illustrated in FIG. 11B. In this state, the speech sound component of the user can be appropriately detected without being disturbed by the noise component from the noise source (corresponding to FIGS. 10B and 10C).

Then, when the movable unit 14 rotates as illustrated in FIG. 10D according to the speech of the user, the noise suppression direction and the sound source direction match each other. FIG. 11C exemplifies the spatial spectrum when the noise suppression direction and the sound source direction match each other in this manner. In this case, not only the component from the sound source direction is suppressed but also the noise component from the noise source cannot be suppressed, and there is a possibility that a peak occurs in the noise direction as illustrated in the diagram. That is, noise may be erroneously emphasized. From these points, there is a possibility that the speech sound component of the user cannot be properly detected.

Accordingly, in the present embodiment, the channel shift unit 17a illustrated in FIGS. 3 and 4 is provided to prevent the noise suppression direction from changing due to rotation of the movable unit 14.

For the signal from the microphone 13, the channel shift unit 17a changes the correspondence relationship between a signal input channel mCH and a processing channel pCH by the voice extraction processing unit 17b on the basis of the rotation angle information Sr.

In the present embodiment, a rotation of the movable unit 14 is performed so that the position of each microphone 13 after the rotation matches the position where another microphone 13 has been present before the rotation. That is, if the microphone array 12 includes four microphones 13 arranged at equal intervals, and the horizontal angle θ at which any one microphone 13 out of the four microphones 13 has been positioned before the rotation is zero degree, the angle that the movable unit 14 can rotate is restricted to any one of 90 degrees, 180 degrees, and 270 degrees.

Figure 12:
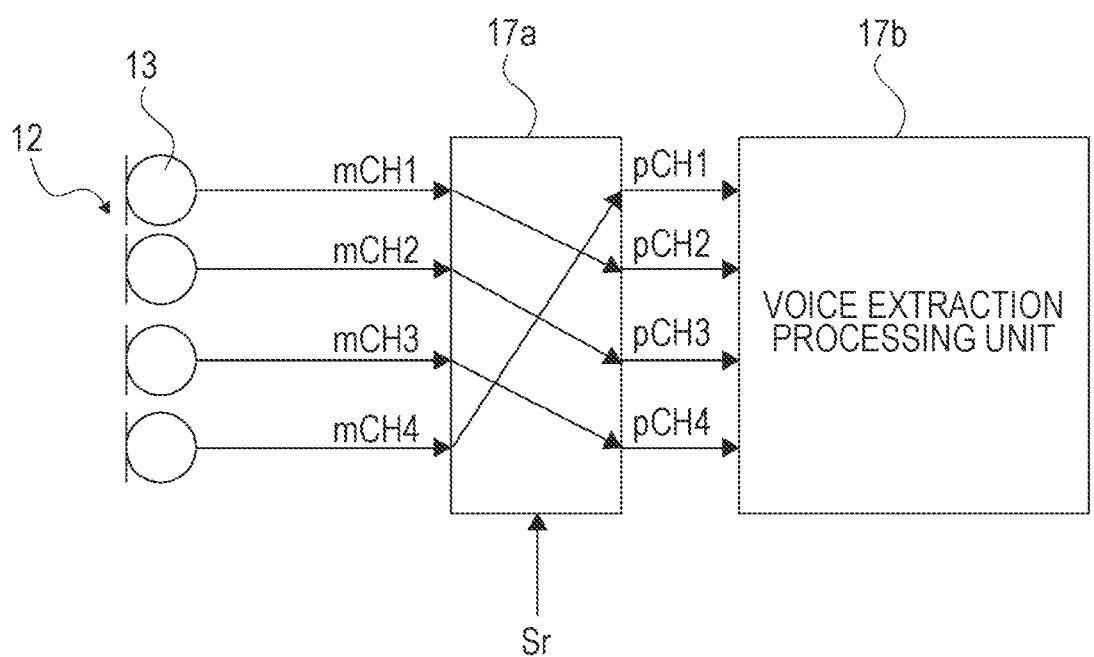
FIG. 12 is a diagram illustrating an example of channel shifts.

FIG. 12 is a diagram illustrating an example of channel shifts by the channel shift unit 17a.

Specifically, FIG. 12 illustrates, in a case where the number of microphones 13 in the microphone array 12 is four, and input channels mCH of the respective microphones 13 arranged on the circumference are sequentially denoted by mCH1 to mCH4 along one direction, a state of a channel shift when the movable unit 14 is rotated by 45 degrees so that the position of the microphone 13 of the input channel mCH1 after a rotation matches the position of the microphone 13 of the input channel mCH2 before a rotation.

In this case, it is assumed that before the rotation of the movable unit 14, the correspondence relationship between the input channel mCH and the processing channel pCH is "mCH1=pCH1", "mCH2=pCH2", "mCH3=pCH3", and "mCH4=pCH4".

In the channel shift in this case, the correspondence relationship between the input channel mCH and the processing channel pCH after the rotation changes to "mCH1=pCH2", "mCH2=pCH3", "mCH3=pCH4", and "mCH4=pCH1" as illustrated in the diagram. That is, the input channel mCH is shifted one by one with respect to the processing channel pCH.

If the above is generalized given that the number of microphones 13 in the microphone array 12 is N (N is a natural number of two or more), and the rotation amount of the movable unit 14 is a rotation amount 1 (1 is a natural number of N−1 or less) in units of the number of microphones 13, the channel shift for a target input channel mCHn is performed as follows.

That is, if "n+1≤N", the target input channel mCHn is made to correspond to the processing channel pCH(n+1), and if "n+1>N", the target input channel mCHn is made to correspond to a channel pCH(n+1−N).

Note that the above is the channel shift in a case where the rotation direction of the movable unit 14 matches the ascending direction of the number at the end of the input channel mCH. When the movable unit 14 is rotated in the opposite direction, the target input channel mCHn is made to correspond to the processing channel pCH(n−1+N) if "n1≤0", and is made to correspond to the processing channel pCH(n1) if "n+1>N".

By performing the channel shift as described above, since the signal channel is switched in the previous stage of a direction estimation algorithm, as viewed from the direction estimation algorithm side, the process that has been performed (particularly the learning process of the noise space correlation matrix K) can be continued without changing anything.

FIG. 13 is a diagram for explaining effects of the channel shifts.

FIG. 13A and FIG. 13B represent states of the movable unit 14 before a rotation and, similarly to FIG. 11A and FIG.

11B above, represent that the component in the noise direction can be appropriately suppressed as the noise learning progresses.

With the channel shift described above, even if the movable unit 14 rotates, the noise suppression direction can be maintained in a direction illustrated in FIG. 10C. Therefore, as illustrated in FIG. 13C, it is possible to prevent a peak from occurring in the noise direction even in the spatial spectrum after the rotation, and it is possible to appropriately cause a peak to occur in the sound source direction when a speech of the user occurs. Therefore, the component of the speech sound can be appropriately emphasized and the noise component can be appropriately suppressed, and deterioration of the voice extraction performance after the rotation can be prevented.

Here, in this example, the speech direction estimation unit 32 (noise correlation matrix calculation unit 42) suspends learning of the noise characteristic while the movable unit 14 is rotating, that is, while each microphone 13 is being displaced. Specifically, learning of the noise space correlation matrix K is interrupted.

Thus, it is possible to prevent the noise characteristic information, which had been learned before changing the position of the microphone, from changing due to learning during changing the position.

Particularly, in this example, since there is a possibility that operating sound of the servo motor 21 is picked up by each microphone 13 while each microphone 13 is being displaced, it is meaningful also in this point to interrupt the learning of the noise characteristic during the displacement of each microphone 13.

[1-5. Processing Method]

Next, with reference to a flowchart in FIG. 14, a specific processing procedure to be executed to achieve the signal processing method as the first embodiment described above will be described.

Figure 14:
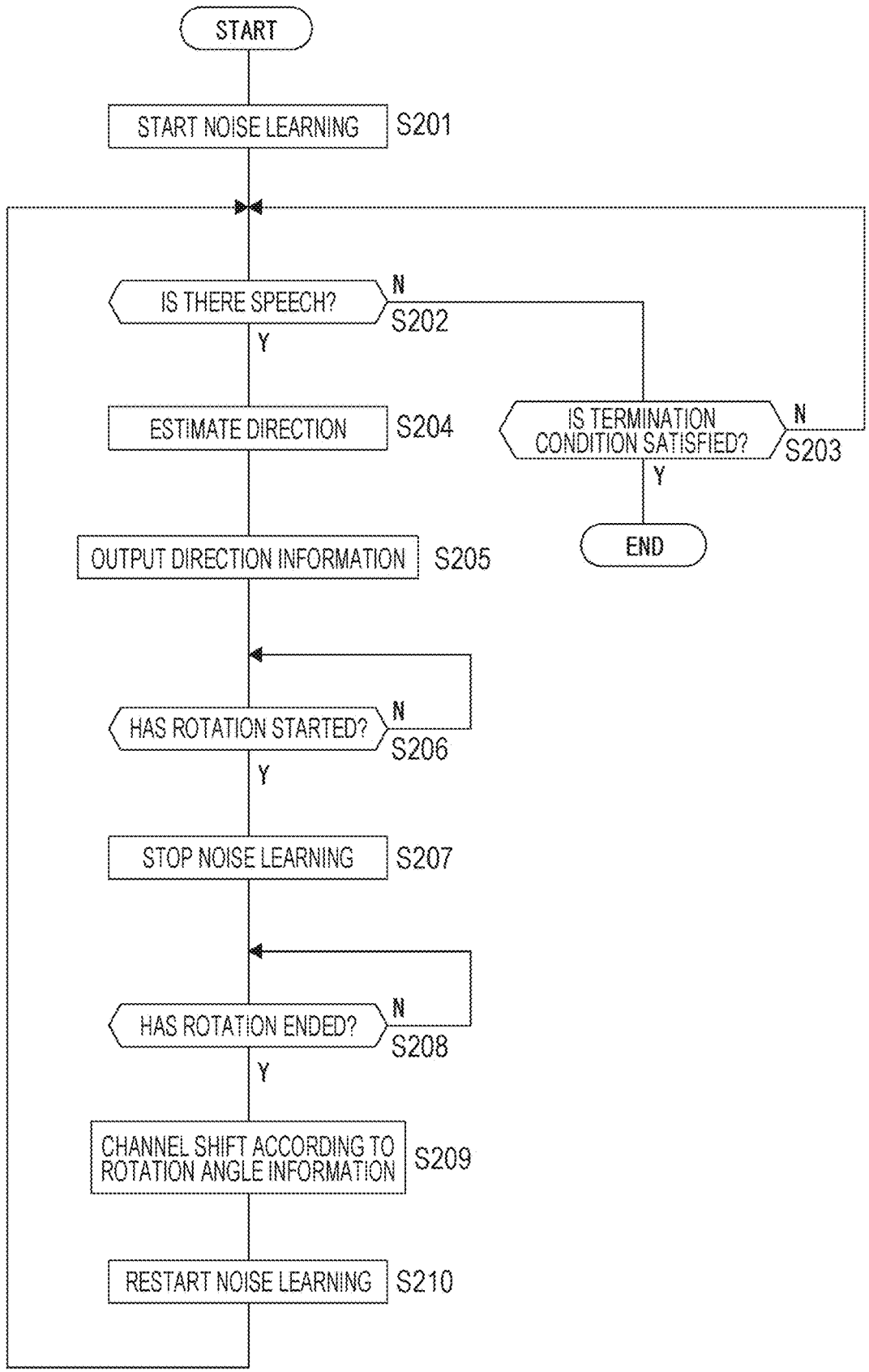
FIG. 14 is a flowchart illustrating a specific processing procedure to be executed to achieve a signal processing method as the first embodiment.

Note that the process illustrated in FIG. 14 is executed by the voice signal processing unit 17 in this example.

First, the voice signal processing unit 17 starts the noise learning in step S201. This process corresponds to a process in which the noise correlation matrix calculation unit 42 in the speech direction estimation unit 32 starts learning of the noise space correlation matrix K.

In subsequent step S202, the voice signal processing unit 17 determines whether or not there has been a speech. This process is, for example, a process of determining whether or not a speech section is detected by the process of the speech section estimation unit 33.

If it is determined that there is no speech, the voice signal processing unit 17 determines whether or not a termination condition is satisfied in step S203. That is, for example, it is determined whether or not a predetermined processing termination condition, such as turning off the power of the signal processing device 1, is satisfied. If the ending condition is satisfied, the voice signal processing unit 17 ends the series of processes illustrated in this flowchart, and if the termination condition is not satisfied, the process returns to step S202.

Depending on the process of steps S202 and S203, a loop process is formed to wait until either condition of the detection of a speech or the satisfaction of the termination condition is satisfied.

If it is determined in step S202 that there has been a speech, the voice signal processing unit 17 estimates a direction in step S204 and then outputs direction information in step S205. The process of steps S204 and S205 corresponds to a process in which the speech direction estimation unit 32 estimates the speech direction and outputs the speech direction information Sd.

In step S206 following step S205, the voice signal processing unit 17 waits for a rotation of the movable unit 14 to start. Whether or not the rotation of the movable unit 14 has started can be determined on the basis of the rotation angle information Sr output by the control unit 18. Alternatively, the control unit 18 may be configured to transmit control start information indicating that the control for driving the servo motor 21 is started to the voice signal processing unit 17, and it may be determined whether or not the movable unit 14 has started rotation on the basis of the control start information.

If it is determined that the movable unit 14 has started rotation, the voice signal processing unit 17 stops the noise learning until the rotation ends by a process of steps S207 and S208. That is, the learning of the noise space correlation matrix K is stopped. Thus, as the noise space correlation matrix K, the learning information until just before the rotation of the movable unit 14 is started is maintained.

If it is determined in step S208 that the rotation has ended, the voice signal processing unit 17 performs the channel shift according to the rotation angle information Sr in step S209. Note that the channel shift in the present embodiment has already been described, and thus the duplicate description will be omitted.

In response to the channel shift in step S209, the voice signal processing unit 17 restarts the noise learning in step S210, that is, restarts learning of the noise space correlation matrix K, and returns to step S202.

Thus, if a speech of the user is newly detected and the movable unit 14 rotates accordingly, the channel shift is performed according to the rotation angle information Sr. Further, the noise learning is suspended while the movable unit 14 is rotating.

2. Second Embodiment

[2-1. Signal Processing Method as Second Embodiment]

Next, a Second Embodiment Will be Described.

In the first embodiment, the rotation angle of the movable unit 14 is restricted, but in the second embodiment, a rotation to a position where other microphone 13 has not been present is allowed.

Note that in the following description, the same reference numerals and the same step numbers will be used for configurations and processes similar to those already described, and the description thereof will be omitted.

In the second embodiment, even if the position of the microphone 13 after a rotation does not exactly match a position where another microphone 13 has been present before the rotation, if a positional error therebetween is within a certain range, the rotation is allowed, the channel shift is performed, and the speech direction estimation is performed using noise characteristic learned before the rotation as they are.

The allowable position error will be described with reference to FIGS. 15 and 16.

Here, it is assumed that the number of microphones 13 in the microphone array 12 is four.

FIG. 15 is a diagram illustrating an example of the rotation angle.

First, in the following description, it is assumed that the direction in which the microphone 13 of the input channel mCH1 is located matches the front direction of the signal processing device 1. Further, the rotation angle=0 degrees means the origin angle of the servo motor 32. In the following description, the horizontal angle θ represents an angle with reference to the origin angle of the servo motor 32. That is, in a state prior to a rotation illustrated in FIG. 15A, the direction in which the microphone 13 of the input channel mCH1 is located matches the 0 degree direction, and this is a state that the front direction of the signal processing device 1 (front direction of the movable unit 14) matches the direction of the origin angle of the servo motor 32.

It is assumed that a speech occurs from the state illustrated in FIG. 15A and that each microphone 13 is rotated as illustrated in FIG. 15B to face the speech direction. The rotation angle at this time is described as "angle θ_e". As described above, since the speech direction estimated in the speech direction estimation process is represented by the horizontal angle θ, it can be said that the angle θ_e is the angle of the speech direction estimated in the speech direction estimation process.

FIG. 16 is an explanatory diagram of a position error.

As illustrated in the diagram, a position error D is obtained as an error between a reference angle θ_n and the angle θ_e. The reference angle θ_n means a rotation angle up to the position closest to the position of the target microphone 13 after a rotation among positions of respective microphones 13 before the rotation, which are represented by broken lines in the diagram, with the position of the target microphone 13 (here, the microphone 13 of the input channel mCH1) before the rotation being the origin.

In the second embodiment, it is determined whether or not to perform the channel shift described in the first embodiment on the basis of a comparison result of the position error D and a predetermined threshold THd.

Specifically, for the position error D calculated as |θ_e−θ_n|, if "D≤THd", the channel shift is performed, or otherwise the channel shift is not performed.

Thus, even if the position after the rotation of the microphone 13 and the position where the other microphone 13 has been present are not completely the same, it is possible to perform voice extraction using the channel shift if the position error D therebetween is small.

Note that, in a case where it is possible to horizontally displace the face picture (especially the eye portion) displayed on the display unit 15, for example, by making the display unit 15 rotatable independently of the movable unit 14, or the like, the line of sight can be adjusted to the speaking person even though the front surface of the signal processing device 1 does not face the speech direction, and thus the threshold THd can be set to a large value.

Here, in the second embodiment, if the position error D is not less than or equal to the threshold THd, the voice extraction process is performed on the basis of the noise characteristic learned in the past. Specifically, in the second embodiment, for example, it is assumed that at a predetermined timing such as a timing when the signal processing device 1 is first installed in a certain place, calibration for learning the noise space correlation matrix K of each horizontal angle θ is performed.

This calibration is performed by learning, for example, the noise space correlation matrix K in a state of each horizontal angle θ while changing the rotation angle (horizontal angle θ) of the movable unit 14 one degree at a time by drive control of the servo motor 21 by the control unit 18.

The noise space correlation matrix K for every horizontal angle θ obtained by the calibration is stored inside the signal processing device 1 as table information as illustrated in FIG. 17, for example.

Hereinafter, a table representing the correspondence relationship of the noise space correlation matrix K for every horizontal angle θ as illustrated in FIG. 17 will be referred to as a "matrix table 50".

Note that in the calibration, the interval of the horizontal angle θ for learning the noise space correlation matrix K is not limited to one degree, and may be another interval such as an interval of two degrees or more, for example.

If the position error D is not equal to or less than the threshold TH, the noise space correlation matrix K corresponding to the rotation angle θ_e is acquired from the matrix table 50 as described above, and the speech direction estimation process is performed using the acquired noise space correlation matrix K.

The speech direction estimation processing in this case is performed on the basis of the noise space correlation matrix K acquired from the matrix table 50 (that is, the noise space correlation matrix K learned in the past) and the noise space correlation matrix K obtained by newly started learning after the rotation of the movable unit 14 (that is, the noise space correlation matrix K learned from the latest input signal: the noise space correlation matrix K being learned). Specifically, when the noise space correlation matrix K acquired from the matrix table 50 is "K_d" and the noise space correlation matrix K being learned is "K_n", a noise space correlation matrix K_a obtained by the following [Formula 15] is used to perform the speech direction estimation process. [Mathematical Formula 10]

$$K\_a = (1-E)K\_d + E \cdot K\_n \qquad \text{[Formula 15]}$$

In [Formula 15], "E" is an update coefficient for smoothly reflecting the value of "K_n" being learned on "K_d" learned in the past, and the value gradually increases according to a passage of time within the range of "0<E≤1". Thus, with respect to "K_a" used in the speech direction estimation process, while the degree of reflection of "K_d" learned in the past gradually decreases, the degree of reflection of "K_n" being learned gradually increases, and eventually a state that only "K_n" being learned is reflected is obtained.

If the position error D is not less than or equal to the threshold TH, it is possible to continue using "K_d" acquired from the matrix table 50 as it is as "K_a". However, there is a case where the surrounding environment has changed since the time of calibration. For example, noise of the air conditioner, which has not presented at the time of calibration, is generated, or the like.

By applying the above [Formula 15], even if there has been a change in the noise characteristic since the past learning, it is possible to perform the appropriate speech direction estimation process according to the current noise characteristic.

Here, in a case of updating the noise space correlation matrix K_a by [Formula 15], in response to that the above switching from "K_d" learned in the past to "K_n" being learned is completed (that is, the update coefficient E is set to "1"), "K_d" in the matrix table 50 is updated by "K_n" being learned. That is, "K_d" stored corresponding to the angle θ_e in the matrix table 50 is updated by "K_n" being learned.

Thus, the value of the noise space correlation matrix K which has been learned most recently can be reflected in the matrix table 50. Therefore, the voice extraction performance can be improved.

Further, in the second embodiment, in updating the noise space correlation matrix K_a by [Formula 15], the value of the update coefficient E is not unconditionally increased according to a passage of time, and if the predetermined condition is satisfied, the value of the update coefficient E is not increased. Specifically, the value of the update coefficient E is not increased while the current signal section of the signal from the microphone 13 is regarded as the speech section.

If the noise space correlation matrix K is learned in the speech section, the accuracy of the noise space correlation matrix K deteriorates, and thus the noise space correlation matrix K is not learned in the speech section (see the first embodiment). Thus, it is meaningless to increase the degree of reflection of the noise space correlation matrix K_n being learned in the speech section.

Thus, by not increasing the value of the update coefficient E in the speech section as described above, it is possible to appropriately increase the degree of reflection of the noise space correlation matrix K_n being learned according to the progress of learning, and thus the voice extraction performance can be improved.

According to the method using the matrix table 50 as described above, even in the case of performing rotation by which the position of each microphone 13 is changed to a position different from the position where another microphone 13 has been present, it is possible to prevent the voice extraction performance from deteriorating, and thus it is possible to eliminate the need to provide a restriction on the rotation angle of the movable unit 14 as in the first embodiment.

In a case where the number of microphones 13 in the microphone array 12 is small, a situation in which there are no microphones 13 close to the speech direction easily occurs. The second embodiment is suitable in a case where the number of microphones 13 is small in this manner.

[2-2. Electrical Configuration of Signal Processing Device]

An electrical configuration example of the voice signal processing unit 17A included in the signal processing device 1 as the second embodiment will be described with reference to FIGS. 18 and 19.

Figure 18:
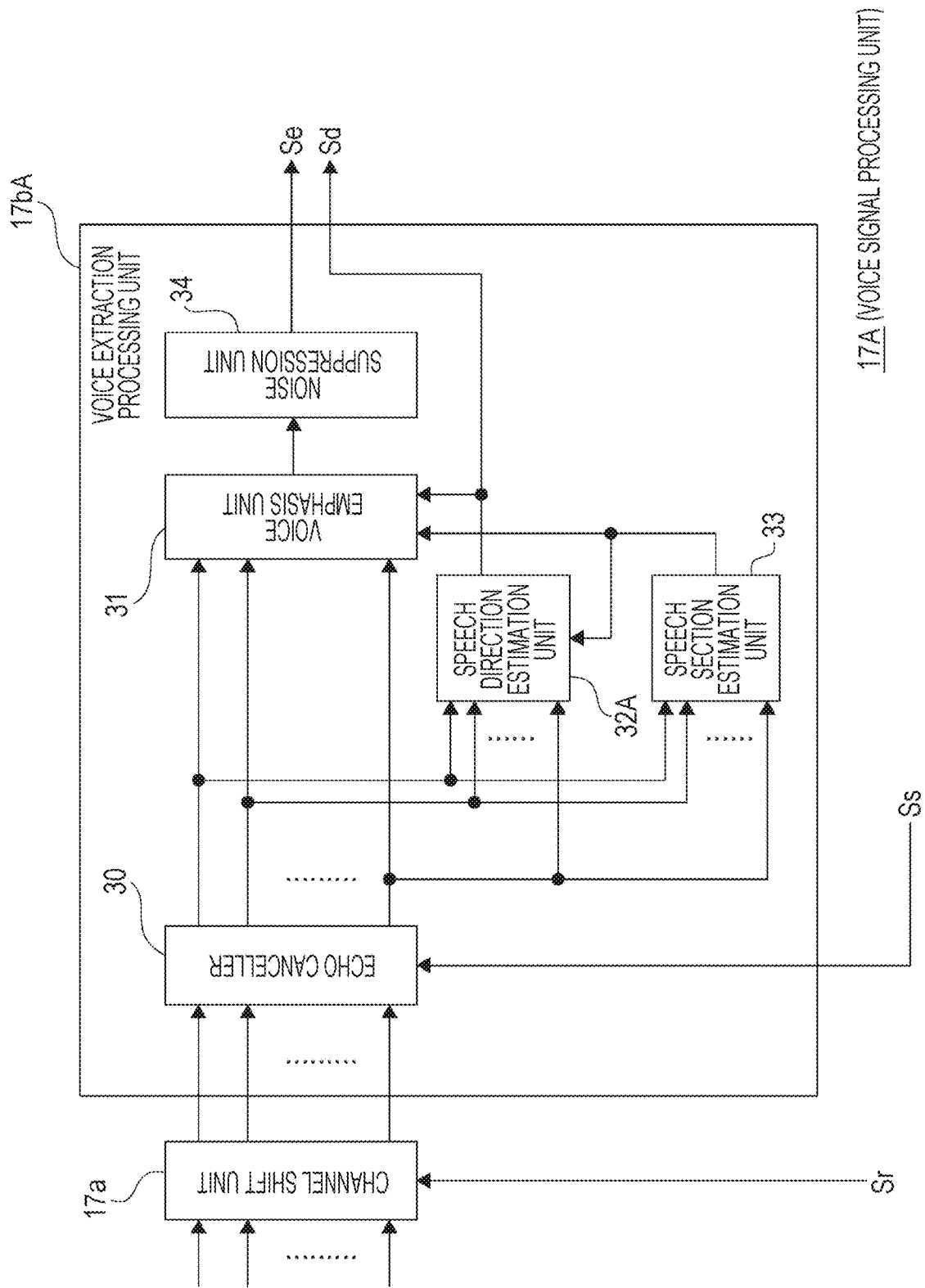
FIG. 18 is a block diagram illustrating an internal configuration example of a voice signal processing unit included in a signal processing device as a second embodiment.

As illustrated in FIG. 18, the voice signal processing unit 17A is different from the voice signal processing unit 17 illustrated in FIG. 4 in that a voice extraction processing unit 17bA is provided in place of the voice extraction processing unit 17b.

The voice extraction processing unit 17bA is different from the voice extraction processing unit 17b in that a speech direction estimation unit 32A is provided in place of the speech direction estimation unit 32.

Figure 19:
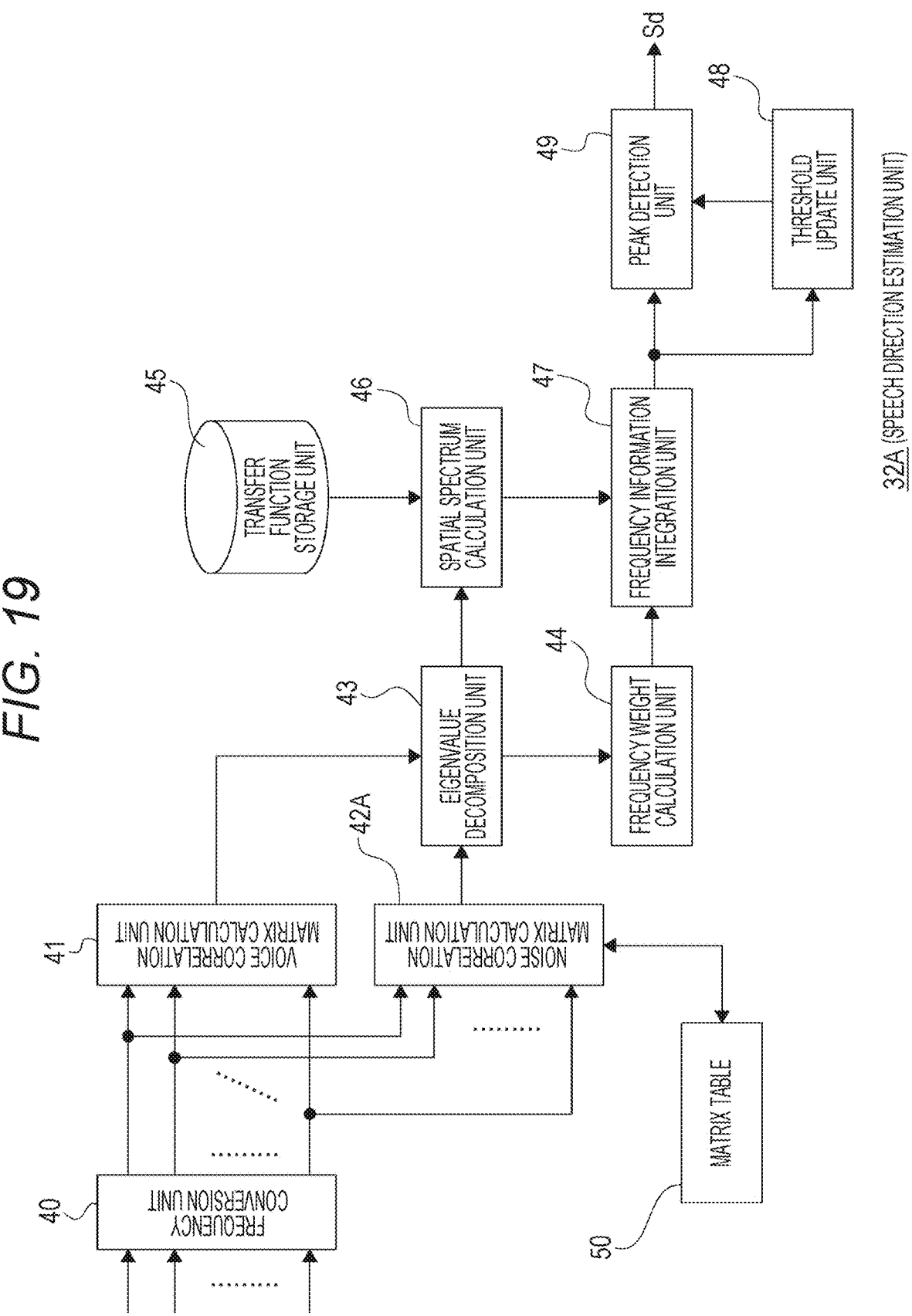
FIG. 19 is a block diagram illustrating an internal configuration example of a speech direction estimation unit included in the signal processing device as the second embodiment.

As illustrated in FIG. 19, the speech direction estimation unit 32A is different from the speech direction estimation unit 32 illustrated in FIG. 5 in that a noise correlation matrix calculation unit 42A is provided in place of the noise correlation matrix calculation unit 42, and that the matrix table 50 is provided.

The noise correlation matrix calculation unit 42A performs, on the basis of a determination result of channel shift availability based on the position error D and the threshold THd described above, the speech direction estimation process stored in the matrix table 50 and based on the noise space correlation matrix K_d learned in the past. Specifically, if "positional error D threshold THd" and it is determined that the channel shift is possible, the noise correlation matrix calculation unit 42A performs, after the rotation of the movable unit 14, the speech direction estimation process using the noise space correlation matrix K learned before the rotation without change. Further, if "positional error D≥threshold THd" and it is determined that the channel shift is not possible, the noise correlation matrix calculation unit 42A, after the rotation of the movable unit 14, discards the noise space correlation matrix K being learned before the rotation, newly starts learning of the noise space correlation matrix K, and on the basis of the noise space correlation matrix K_n being learned and the noise space correlation matrix K_d corresponding to the angle θ_e acquired from the matrix table 50, obtains the noise space correlation matrix K_a according to [Formula 15], and performs the speech direction estimation process using the noise space correlation matrix K_a.

[2-3. Processing Procedure]

Figure 20:
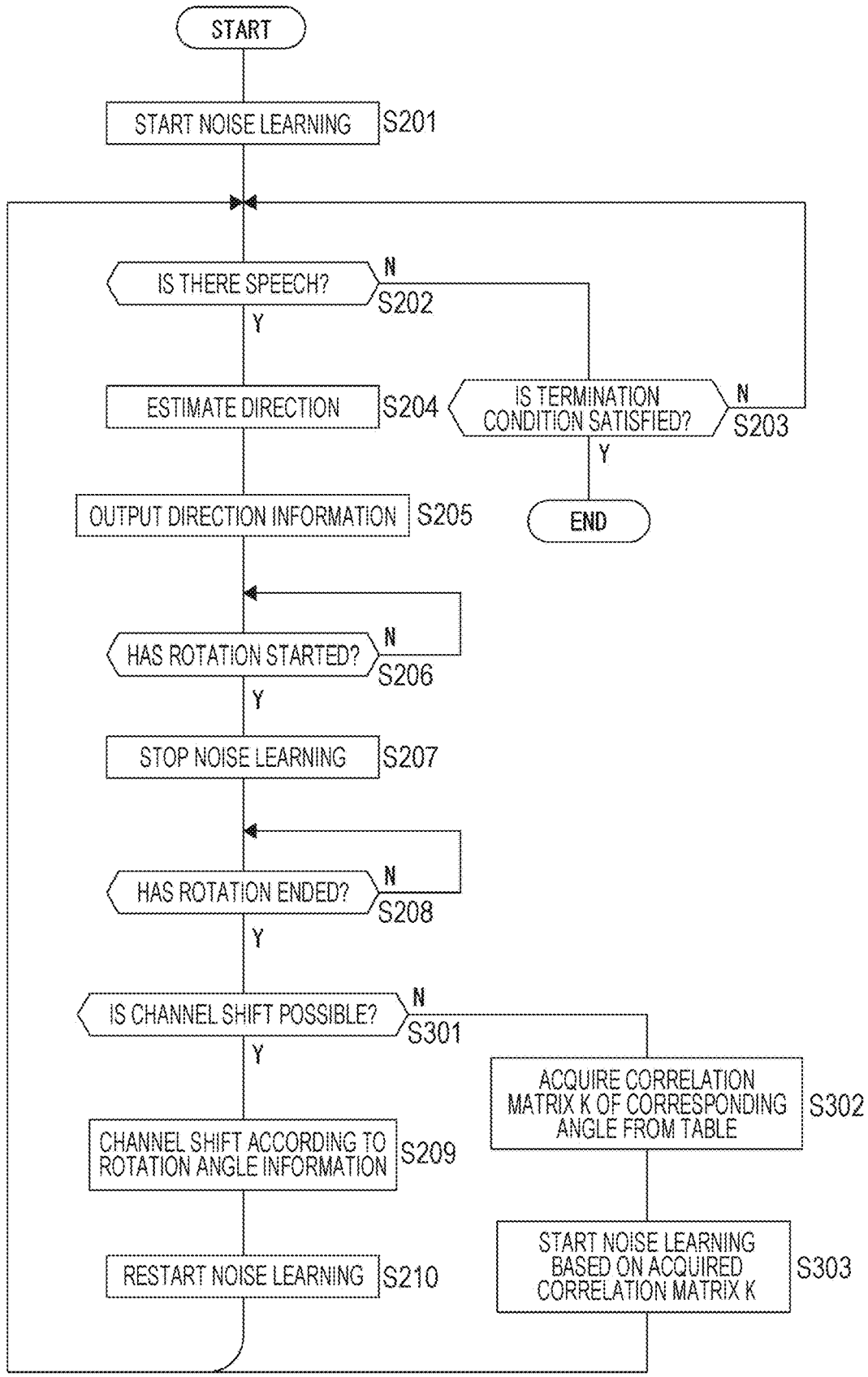
FIG. 20 is a flowchart illustrating a specific processing procedure to be executed to achieve the signal processing method as the second embodiment.

FIG. 20 is a flowchart illustrating a specific processing procedure to be executed in order to achieve the signal processing method as the second embodiment.

Note that the processing illustrated in FIG. 20 is executed by the voice signal processing unit 17A.

A difference from the process of the first embodiment illustrated in FIG. 14 is that a process of steps S301 to S303 is added.

If it is determined in step S208 that the rotation is completed, the voice signal processing unit 17A advances the process to step S301 and determines whether or not the channel shift is possible. That is, the position error D, which is the error between the reference angle θ_n and the angle θ_e described above, is calculated with |θ_e−θ_n|, and if "D≤THd", a determination result that the channel shift is possible is obtained, and if not, a determination result that the channel shift is not possible is obtained.

If it is determined that the channel shift is possible, the voice signal processing unit 17A advances the processing to step S209. Thus, in a case where the position error D is small, the channel shift described in the first embodiment is performed.

On the other hand, if it is determined that the channel shift is not possible, the voice signal processing unit 17A proceeds to step S302, and performs a process of acquiring the correlation matrix K of the corresponding angle from the table. That is, the noise space correlation matrix K_d corresponding to the angle θ_e is acquired from the matrix table 50.

In step S303 following step S302, the voice signal processing unit 17A starts noise learning based on the acquired correlation matrix K, and returns to step S202.

As a process of step S303, the voice signal processing unit 17A discards the noise space correlation matrix K being learned before the rotation of the movable unit 14 and newly starts learning the noise space correlation matrix K, and on the basis of the noise space correlation matrix K_n being learned and the noise space correlation matrix K_d acquired in step S302, starts a process of obtaining the noise space correlation matrix K_a is started according to [Formula 15].

Thus, the speech direction estimation process is performed thereafter using the noise space correlation matrix K_a.

3. Modification Example

Here, the present technology is not limited to the above-described specific examples, and various modifications are possible without departing from the gist of the present technology.

For example, in the second embodiment, the example has been presented in which the voice extraction is performed based on the noise characteristic learned in the past in a case where it is determined that the channel shift is not possible. However, it is also possible to employ a method that, in a case where it is determined that the channel shift is not possible, discards (resets) the learning information of the noise characteristic up to that point, and restarts the learning of the noise characteristic from the beginning.

Further, in the above, the example has been described in which a displacement of each microphone 13 is a displacement accompanying rotation of the target device itself equipped with the microphones 13, but the displacement of each microphone 13 may be associated with movement of the target device. In this case, for example, assuming that the target device is moved in the order of position A→position B→position C→position A, when movement of the last position C→position A is performed, there may be a case where "the respective positions of the plurality of microphones are changed to positions where the respective other microphones have been present".

Further, the plurality of microphones 13 may be arranged in another arrangement such as a linear arrangement instead of a circumferential arrangement. Even in that case, there may be a case where "the respective positions of the plurality of microphones are changed to positions where other microphones have been present" accompanying the movement of the target device.

Figure 21:
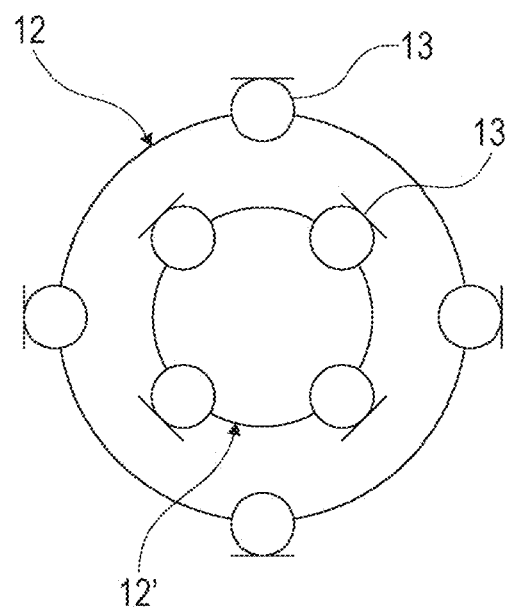
FIG. 21 is a diagram illustrating a microphone arrangement example as a modification example.

Further, the arrangement of the microphones 13 may be as illustrated in FIG. 21, for example.

In the example of FIG. 21, together with the microphone array 12, a microphone array 12' including a plurality of microphones 13 arranged at a height different from the microphones 12 is provided on the target device. The horizontal angle θ at which the respective microphones 13 in the microphone array 12' are arranged is different from the horizontal angle θ at which the respective microphones 13 in the microphone array 12 are arranged.

By intentionally shifting the positions of the respective microphones 13 in the microphone array 12' with respect to the positions of the respective microphones 13 in the microphone array 12 in this manner, it is possible to increase the rotation angle that allows the channel shift. Specifically, in this case, the rotation angle allowing the channel shift is, as described in the first embodiment, applicable to not only the rotation angle that satisfies the condition that the positions of the respective microphones 13 in the microphone array 12 after the rotation match the positions where other microphones 13 in the microphone array 12 have been present before the rotation, but also the rotation angle that satisfies the condition that the positions of the respective microphones 13 in the microphone array 12 after the rotation match the positions where the microphones 13 in the microphone array 12' have been present before the rotation.

Note that the "positions" of the microphones 13 here mean positions in the two-dimensional space when axes parallel to the horizontal plane and in an orthogonal relationship with each other are the X axis and the Y axis.

4. Summary of Embodiment

As described above, the signal processing device (same 1) as the embodiment includes a voice extraction unit (voice signal processing unit 17 or 17A) that performs voice extraction from signals of a plurality of microphones, and the voice extraction unit uses, when respective positions of the plurality of microphones are changed to positions where other microphones have been present, respective signals of the plurality of microphones as signals of the other microphones.

Thus, it is possible to cancel the effect of changing the positions of respective microphones on the voice extraction.

Therefore, it is possible to prevent deterioration in voice extraction performance when the positions of the plurality of microphones are changed.

Further, in the signal processing device as the embodiment, the voice extraction unit uses the respective signals of the plurality of microphones as signals of other microphones by a channel shift on the signals of the plurality of microphones.

The channel shift can be achieved by a simple method such as a method of giving, to the signal of each microphone, an identifier indicating with which processing channel the signal is to be processed, for example.

Therefore, it is possible to easily achieve a configuration for using the signals of the plurality of microphones as the signals of the other microphones.

Moreover, in the signal processing device according to the embodiment, the voice extraction unit performs the voice extraction on the basis of the signals of the plurality of microphones arranged on a circumference.

Since the voice extraction is performed on the basis of the signals of the respective microphones arranged on the circumference, the voice extraction performance is improved in that the voice extraction is possible regardless of which direction the sound source direction is.

Further, as exemplified in the embodiment, in a case where the device including the signal processing device according to the present technology is a device that faces the speech direction in response to a speech detection, it is possible to prevent deterioration in the voice extraction performance that occurs accompanying a rotation of the device (displacement of each microphone).

Furthermore, in the signal processing device according to the embodiment, the voice extraction unit performs the voice extraction on the basis of noise characteristic learned on the basis of the signals of the plurality of microphones.

Thus, it becomes possible to perform the voice extraction on the basis of signals in which noise components are suppressed.

Therefore, the voice extraction performance can be improved.

Further, in the signal processing device as the embodiment, the voice extraction unit suspends the learning of the noise characteristic while the positions of the plurality of microphones are being changed.

Thus, it is possible to prevent the noise characteristic information, which had been learned before changing the position of the microphone, from changing due to learning during changing the position.

Therefore, the voice extraction performance can be improved.

Moreover, in the signal processing device as the embodiment, the voice extraction unit (voice signal processing unit 17A) determines whether or not to perform the channel shift on the basis of a size of an error between the positions of the microphones after the positions are changed and positions where the other microphones have been present.

Thus, even if the positions of the microphone after the positions are changed and the positions where the other microphones have been present are not exactly the same positions, if the position error therebetween is small, it is possible to perform the voice extraction using the channel shift.

Therefore, it is possible to improve the degree of freedom of changeable positions while preventing deterioration in the voice extraction performance accompanying changes of the positions of the plurality of microphones.

Furthermore, in the signal processing device as the embodiment, the voice extraction unit performs, in a case where the positions of the plurality of microphones are changed to positions different from the positions where the other microphones have been present, the voice extraction on the basis of the noise characteristic learned in a past.

Thus, even if the positions of the plurality of microphones are changed to positions different from the positions where the other microphones have been present, the voice extraction can be performed on the basis of the noise characteristic learned at the positions in the past.

Therefore, even if the positions of the plurality of microphones are changed to positions different from the positions where the other microphones have been present, it is possible to suppress deterioration in the voice extraction performance.

Further, in the signal processing device as the embodiment, the voice extraction unit decreases, in voice extraction based on the noise characteristic learned in the past, a degree of reflection of the noise characteristic learned in the past according to a passage of time, and increases a degree of reflection of the noise characteristic being learned according to the passage of time.

Thus, even if the noise characteristic has changed since the past learning, it is possible to perform appropriate voice extraction according to the current noise characteristic.

Therefore, the voice extraction performance can be improved.

Moreover, in the signal processing device as the embodiment, the voice extraction unit does not increase the degree of reflection of the noise characteristic during the learning when a current signal section of the signals of the microphones is regarded as a speech section.

If the noise characteristic is learned in the speech section, the accuracy of the noise characteristic deteriorates, and thus learning of the noise characteristic is not performed in the speech section. Thus, it is meaningless to increase the degree of reflection of the noise characteristic being learned in the speech section.

With the above configuration, it is possible to appropriately increase the degree of reflection of the noise characteristic being learned as the learning progresses, and improve the voice extraction performance.

Further, the signal processing method as the embodiment has a voice extraction step of performing voice extraction from signals of a plurality of microphones, in which in the voice extraction step, when respective positions of the plurality of microphones are changed to positions where other microphones have been present, respective signals of the plurality of microphones are used as signals of the other microphones.

Even with the signal processing method as such an embodiment, a similar operation and effect to those of the signal processing device as the embodiment described above can be obtained.

Here, the functions of the voice extraction processing units 17b and 17bA described so far can be achieved as a software process by a CPU or the like. The software process is executed on the basis of a program, and the program is stored in a storage device readable by a computer device (information processing device) such as a CPU.

A program as an embodiment is a program executed by an information processing device that performs voice extraction from signals of a plurality of microphones, and the program causes the information processing device to implement a function of, in a case where respective positions of the plurality of microphones are changed to positions where other microphones have been present, using respective signals of the plurality of microphones as signals of the other microphones.

With such a program, the signal processing device as the embodiment described above can be achieved.

Note that effects described in the present description are merely examples and are not limited, and other effects may be provided.

5. Present Technology

Note that the present technology can employ configurations as follows.

(1)

A signal processing device including a voice extraction unit that performs voice extraction from signals of a plurality of microphones, in which the voice extraction unit uses, when respective positions of the plurality of microphones are changed to positions where other microphones have been present, respective signals of the plurality of microphones as signals of the other microphones.

(2)

The signal processing device according to (1) above, in which the voice extraction unit uses the respective signals of the plurality of microphones as signals of other microphones by a channel shift on the signals of the plurality of microphones.

(3)

The signal processing device according to (1) or (2) above, in which the voice extraction unit performs the voice extraction on the basis of the signals of the plurality of microphones arranged on a circumference.

(4)

The signal processing device according to any one of (1) to (3) above, in which the voice extraction unit performs the voice extraction on the basis of noise characteristic learned on the basis of the signals of the plurality of microphones.

(5)

The signal processing device according to (4) above, in which the voice extraction unit suspends the learning of the noise characteristic while the positions of the plurality of microphones are being changed.

(6)

The signal processing device according to any one of (2) to (5) above, in which the voice extraction unit determines whether or not to perform the channel shift on the basis of a size of an error between the positions of the microphones after the positions are changed and positions where the other microphones have been present.

(7)

The signal processing device according to any one of (4) to (6) above, in which the voice extraction unit performs, in a case where the positions of the plurality of microphones are changed to positions different from the positions where the other microphones have been present, the voice extraction on the basis of the noise characteristic learned in a past.

(8)

The signal processing device according to (7) above, in which the voice extraction unit decreases, in voice extraction based on the noise characteristic learned in the past, a degree of reflection of the noise characteristic learned in the past according to a passage of time, and increases a degree of reflection of the noise characteristic being learned according to the passage of time.

(9)

The signal processing device according to (8) above, in which the voice extraction unit does not increase the degree of reflection of the noise characteristic during the learning when a current signal section of the signals of the microphones is regarded as a speech section.

REFERENCE SINGS LIST

1 Signal processing device
12, 12' Microphone array
13 Microphone
14 Movable unit
15 Display unit
16 Speaker
17, 17A Voice signal processing unit
17a Channel shift unit
17b, 17bA Voice extraction processing unit
30 Echo canceller
31 Voice emphasis unit
32, 32A Speech direction estimation unit
33 Speech section estimation unit
34 Noise suppression unit
42, 42A Noise correlation matrix calculation unit
50 Matrix table
100 Space

The invention claimed is:

1. A signal processing device comprising a voice extraction unit that performs voice extraction from signals of a plurality of microphones, wherein
the voice extraction unit uses, when respective positions of the plurality of microphones are changed to positions where other microphones have been present, respective signals of the plurality of microphones as signals of the other microphones.

2. The signal processing device according to claim 1, wherein
the voice extraction unit uses the respective signals of the plurality of microphones as signals of other microphones by a channel shift on the signals of the plurality of microphones.

3. The signal processing device according to claim 1, wherein
the voice extraction unit performs the voice extraction on a basis of the signals of the plurality of microphones arranged on a circumference.

4. The signal processing device according to claim 1, wherein
the voice extraction unit performs the voice extraction on a basis of noise characteristic learned on a basis of the signals of the plurality of microphones.

5. The signal processing device according to claim 4, wherein
the voice extraction unit suspends the learning of the noise characteristic while the positions of the plurality of microphones are being changed.

6. The signal processing device according to claim 2, wherein
the voice extraction unit determines whether or not to perform the channel shift on a basis of a size of an error between the positions of the microphones after the positions are changed and positions where the other microphones have been present.

7. The signal processing device according to claim 4, wherein
the voice extraction unit performs, in a case where the positions of the plurality of microphones are changed to positions different from the positions where the other microphones have been present, the voice extraction on a basis of the noise characteristic learned in a past.

8. The signal processing device according to claim 7, wherein
the voice extraction unit decreases, in voice extraction based on the noise characteristic learned in the past, a degree of reflection of the noise characteristic learned in the past according to a passage of time, and increases a degree of reflection of the noise characteristic being learned according to the passage of time.

9. The signal processing device according to claim 8, wherein
the voice extraction unit does not increase the degree of reflection of the noise characteristic during the learning in a case where a current signal section of the signals of the microphones is regarded as a speech section.

10. A signal processing method comprising
a voice extraction step of performing voice extraction from signals of a plurality of microphones, wherein
in the voice extraction step, when respective positions of the plurality of microphones are changed to positions where other microphones have been present, respective signals of the plurality of microphones are used as signals of the other microphones.

11. A program executed by an information processing device that performs voice extraction from signals of a plurality of microphones,
the program causing the information processing device to implement a function of, when respective positions of the plurality of microphones are changed to positions where other microphones have been present, using respective signals of the plurality of microphones as signals of the other microphones.

* * * * *